INVENTORS
William L. McNamara
Frederick Z. Fouse.
BY
ATTORNEYS

Nov. 28, 1944.  W. L. McNAMARA ET AL  2,363,681
LEHR LOADER
Filed Oct. 31, 1942  15 Sheets-Sheet 6

INVENTORS
William L. McNamara
Frederick Z. Fouse.
BY
Cubett, Mahney & Miller
ATTORNEYS Nov. 28, 1944.　　W. L. McNAMARA ET AL　　2,363,681
LEHR LOADER
Filed Oct. 31, 1942　　15 Sheets-Sheet 7

INVENTORS
William L. McNamara.
Frederick Z. Fouse.
BY
Corbett, Mahoney & Miller
ATTORNEYS Nov. 28, 1944.  W. L. McNAMARA ET AL  2,363,681
LEHR LOADER
Filed Oct. 31, 1942  15 Sheets-Sheet 9

INVENTORS
William L. McNamara
Frederick Z. Fouse.
BY
ATTORNEYS

Nov. 28, 1944. W. L. McNAMARA ET AL 2,363,681
LEHR LOADER
Filed Oct. 31, 1942 15 Sheets-Sheet 10
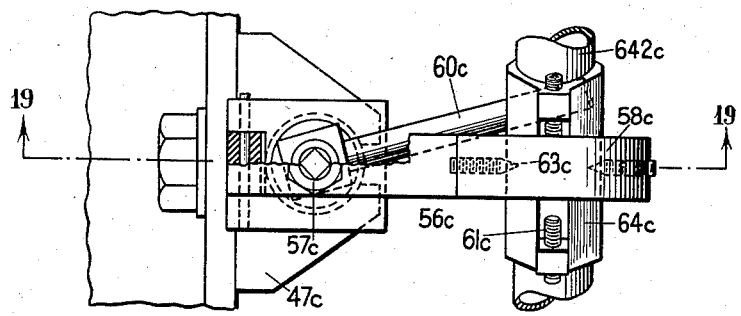
Fig. 18
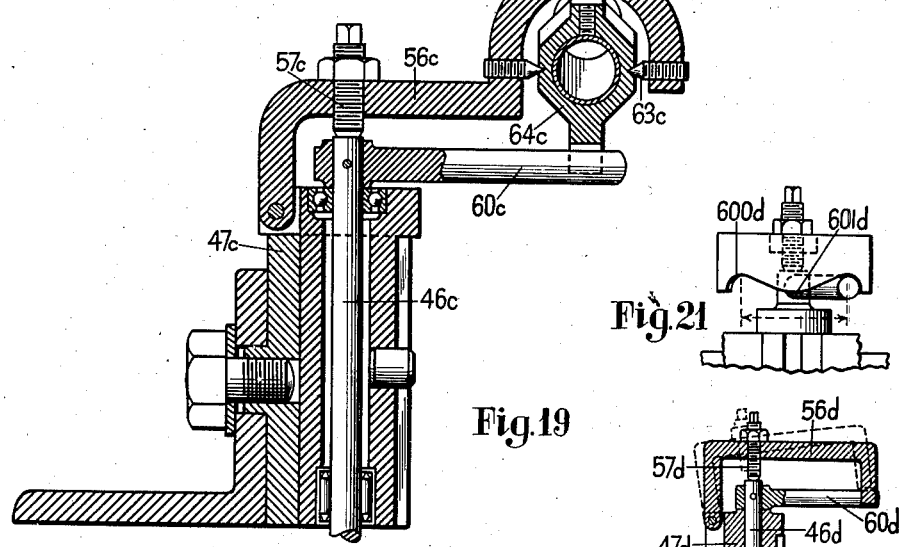
Fig. 19
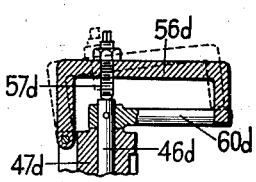
Fig. 21
Fig. 22
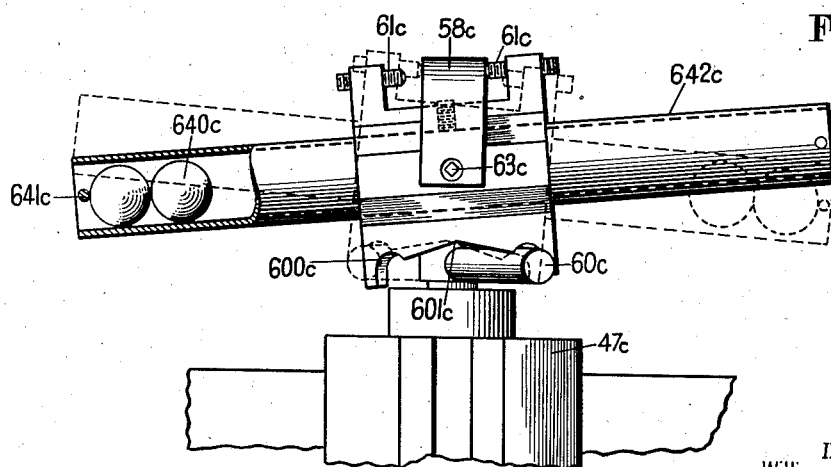
Fig. 20
INVENTORS
William L. McNamara.
Frederick Z. Fouse.
BY
ATTORNEYS Nov. 28, 1944. W. L. McNAMARA ET AL 2,363,681
LEHR LOADER
Filed Oct. 31, 1942 15 Sheets-Sheet 11

INVENTORS
William L. McNamara
Frederick Z. Fouse.
BY
ATTORNEYS

Nov. 28, 1944.  W. L. McNAMARA ET AL  2,363,681

LEHR LOADER

Filed Oct. 31, 1942  15 Sheets-Sheet 12

INVENTORS
William L. McNamara.
Frederick Z. Fouse.
BY
*Corbett, Mahoney & Miller*
ATTORNEYS Nov. 28, 1944.  W. L. McNAMARA ET AL  2,363,681

LEHR LOADER

Filed Oct. 31, 1942  15 Sheets-Sheet 14

INVENTORS
William L. McNamara.
Frederick Z. Fouse.

BY

ATTORNEYS

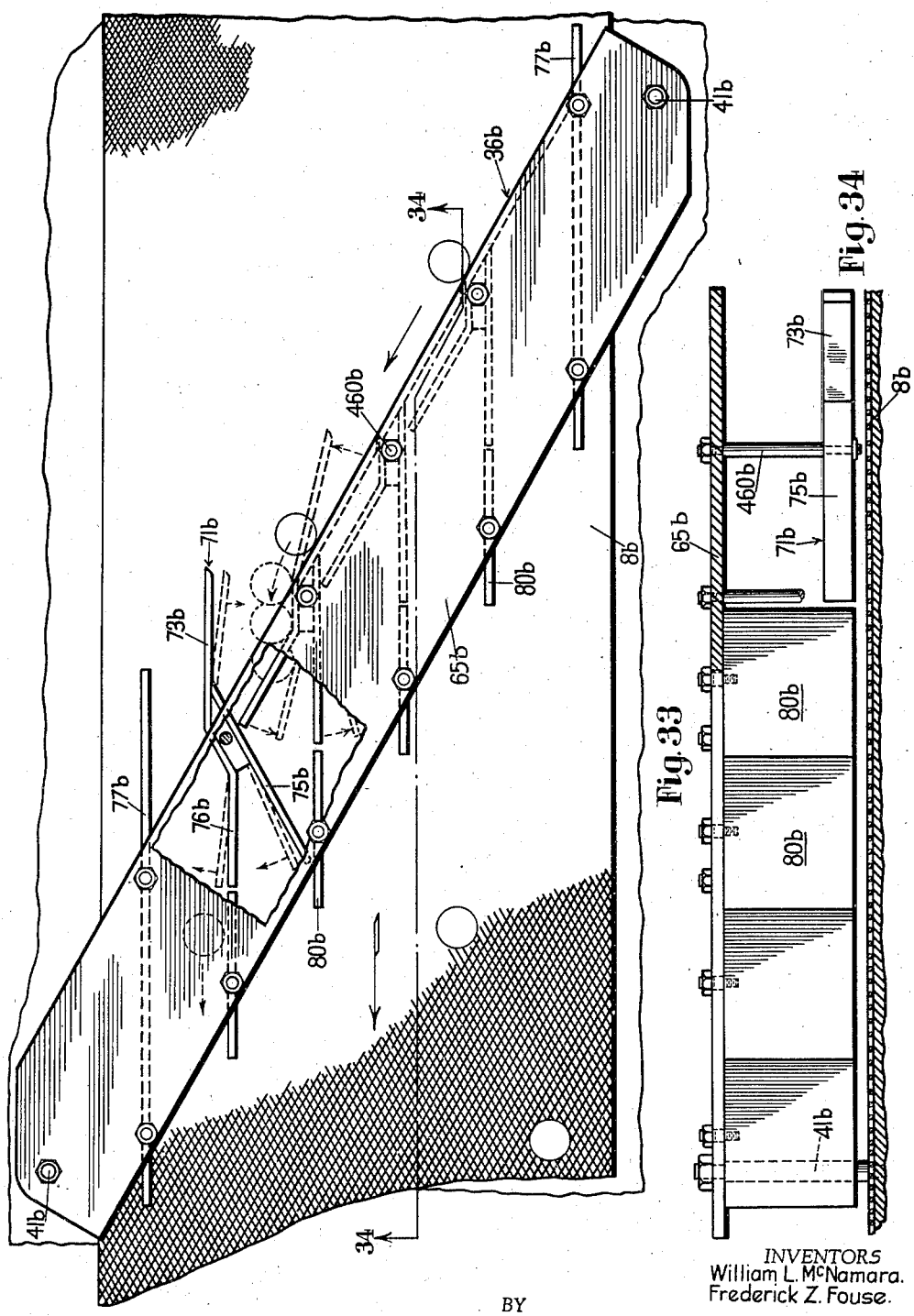

Patented Nov. 28, 1944

2,363,681

UNITED STATES PATENT OFFICE 2,363,681

LEHR LOADER

William L. McNamara and Frederick Z. Fouse, Lancaster, Ohio, assignors to Anchor Hocking Glass Corporation, Lancaster, Ohio, a corporation of Delaware Application October 31, 1942, Serial No. 464,048

33 Claims. (Cl. 198—31)

Our invention relates to a lehr loader. It has to do, more particularly, with apparatus for receiving glassware from a glass-forming machine and transferring it to an annealing lehr, the apparatus serving to arrange the glassware in the lehr in such a manner that a maximum amount of the ware can be handled by the lehr.

At the present time, it is customary to transfer formed glassware from the forming machine onto a continuously moving conveyer where the ware is disposed in a single file. This continuously conveyer usually transfers the ware to some type of lehr-loading apparatus. Many types of lehr loaders are employed at present.

One type commonly employed is known as the pusher bar type. Another type is known as the plow type. Both of these types of lehr loaders receive the ware from the continuously moving conveyer, assemble it in rows transversely of the front of the lehr and then push the articles onto the lehr conveyer. With this type of apparatus, there must be a sufficient period elapse between the removal of the ware from the forming machine and the pushing of the ware into the lehr, in order to permit the ware to set sufficiently so that its shape will not be injured by the pushing or plowing action. Furthermore, even if the ware is set sufficiently to prevent distortion thereof, the ware is subjected to considerable stress by this type of apparatus.

Another type of lehr loader employed is that type known as the gripping tong type. This type is commonly employed in connection with bottles and grips the bottles by their necks, while they are supported on the forming machine conveyer, lifts them and deposits them on the lehr conveyer. This type of apparatus may be of such a nature that it will lift individual bottles or rows of bottles. Such apparatus can be used for certain types of ware only. It is usually designed for a specific shape, height and width of ware. Furthermore, many times the tongs fail to grip the articles securely and, consequently, they drop from the tongs. Also, in gripping the articles they may damage them.

Another type of lehr loader employed at the present time is that type known as the vacuum chuck type. This type includes vacuum chucks which serve to pick up the articles from the forming machine conveyer and deposit them on the lehr conveyer. With this type of apparatus, it sometimes happens that the vacuum fails to hold the article, due to various causes, and will drop the article. Such apparatus may be of such a nature that it will lift individual articles or rows of articles. It is usually designed for handling one particular type of ware.

All of the various types of lehr loaders mentioned above are of a comparatively complicated structure. They are of such a nature that considerable mechanism is involved in their operation. Furthermore, each of these types of lehr-loading apparatus requires timing mechanism which is usually complicated, sensitive and requires accurate adjustment. Because of the complicated nature of these lehr loaders, the initial cost of building such apparatus is considerable. Furthermore, the cost of operation and the cost of upkeep of these various forms of apparatus is considerable.

All of these lehr loaders have usually been of such a type that the most efficient arrangement of the glass articles on the lehr conveyer is not accomplished. This increases the cost of operation of the lehr, and consequently, the cost of the glass articles treated in the lehr.

One of the objects of our invention is to provide a lehr-loading apparatus of such a nature that the glass articles received thereby will be arranged on the leer conveyer in the most efficient manner.

Another object of our invention is to provide a lehr loader which is of such a nature that the glass articles themselves while passing through the apparatus automatically arrange themselves to be presented to the lehr conveyer in a most efficient manner.

Another object of our invention is to provide a lehr loader which is of the type indicated in the preceding paragraph and which, consequently, is of an extremely simple structure, having a minimum amount of mechanicm, and, therefore, which can be built initially at a minmum cost and wherein the operation and upkeep costs will be reduced to a minimum.

Another object of our invention is to provide lehr-loading apparatus of the class described which will handle various types of ware without regard to its height, diameter, taper or other contour characteristics.

Another object of our invention is to provide lehr-loading apparatus of the type indicated which is of such a nature that it can handle various shapes and sizes of articles at the same time.

Another object of our invention is to provide lehr-loading apparatus which will be of such a nature that it may handle a plurality of different types of ware received from the forming machine and will separate the different types of ware into different groups.

Another object of our invention is to provide lehr-loading apparatus which is of such a nature that distortion of the ware will not occur even though the ware has not completely set.

Another object of our invention is to provide lehr-loading apparatus which is of such a nature that the glassware will not be subjected to undue stress.

Another object of our invention is to provide a lehr-loading apparatus of such a nature that the danger of dropping of articles will not be present.

Another object of our invention is to provide lehr-loading apparatus which can be adjusted readily for use with lehrs of different widths.

Another object of our invention is to provide lehr-loading apparatus which can be adjusted readily to the height of the lehr conveyer.

In its preferred form, our invention contemplates the provision of a lehr-loading apparatus embodying a continuously moving conveyer disposed in front of the lehr conveyer and moving in the same direction as the lehr conveyer. The continuously moving conveyer of our apparatus is preferably as wide or wider than the lehr conveyer and moves at a much higher rate of speed than the lehr conveyer. The conveyer of our apparatus is adapted to receive the ware in single file from the forming machine.

Associated with our conveyer we provide an article-guiding and arranging unit. This unit is disposed transversely of the conveyer and at an angle to the path of movement of the conveyer. This unit consists of a stationary supporting structure which supports a plurality of gates that control the path of movement of the article. When all the gates are in closed position, there is provided a continuous guiding surface which extends from the center or one side of the conveyer transversely to the outer or opposite edge of the conveyer. This continuous guiding surface is disposed at an angle relative to the path of movement of the conveyer, the articles received from the forming machine by the conveyer being moved into contact therewith at the forward end of such continuous guide. The guide is disposed on the stationary supporting structure of the unit and, consequently, as the articles are moved into contact therewith by the continuously moving conveyer, they will be moved along such guide laterally relative to the conveyer. The gates which make up the continuous guide are so shaped and of such a nature that none of them will be opened until the first article, which contacts with the guide, reaches the rear or outermost end of the guide. At this time the first article will pass around the outer end of the outermost gate and engage a gate-opening portion which will swing the gate open, the article which actuated the gate being moved along by the conveyer. This permits the second or next article, being moved along the continuous guide, to pass through the space, opened in the guide by opening of the first gate, and permits such article to engage the gate-opening portion of the next gate and open it. At the same time that the second article passes through such space, it will engage a gate-closing portion carried by the first gate and close it. This sequence of operations will continue until the forward or innermost end of the continuous guide is reached. Then the next article will again move to the outermost or rear gate and the sequence of operations will be repeated. Thus, the gates are opened automatically by contact of the articles with the guide. Each article passing through a space opened by one gate will contact with the gate-opening portion of the succeeding gate and the gate-closing portion of the preceding gate. Thus, this article-guiding and arranging unit will serve to automatically arrange the articles in a plurality of longitudinally extending laterally spaced rows on the longitudinally moving conveyer.

After the articles are arranged in longitudinal rows of longitudinally spaced articles, as indicated, the conveyer continues to move them beyond the article-guiding and arranging unit to a transfer unit of a suitable type which will serve to transfer the articles from the lehr loader conveyer to the lehr conveyer. This transferring unit will be of such a nature that it will serve to slow up longitudinal movement of the articles as they are transferred from the lehr loader conveyer to the lehr conveyer. This will serve to bring the articles of each longitudinal row into closely spaced relationship.

The preferred embodiment of our invention is illustrated in the accompanying drawings wherein similar characters of reference designate corresponding parts and wherein:

Figure 18 is a top plan view, partly broken away, of another modified type of gate control mechanism.

Figure 19 is a vertical sectional view taken substantially along line 19—19 of Figure 18.

Figure 20 is an end elevational view, partly broken away, of the structure shown in Figures 18 and 19.

Figure 21 is an end elevational view of another type of gate control mechanism which we may employ.

Figure 22 is a vertical sectional view taken through the structure shown in Figure 21.

Figure 33 is a top plan view, partly broken away, of a modified form of article-engaging and arranging unit.

Figure 34 is a vertical sectional view taken substantially along line 34—34 of Figure 33.

With reference to the drawings, we have illustrated our lehr-loading apparatus associated with the conveyer 1 of a continuous type lehr. The conveyer 1 moves continuously at a slow rate of speed. Our apparatus is adapted to receive the ware from the forming machine and supply it to the lehr conveyer 1 in such a manner that it will be arranged on the lehr conveyer to obtain maximum efficiency of the lehr.

Figure 1:
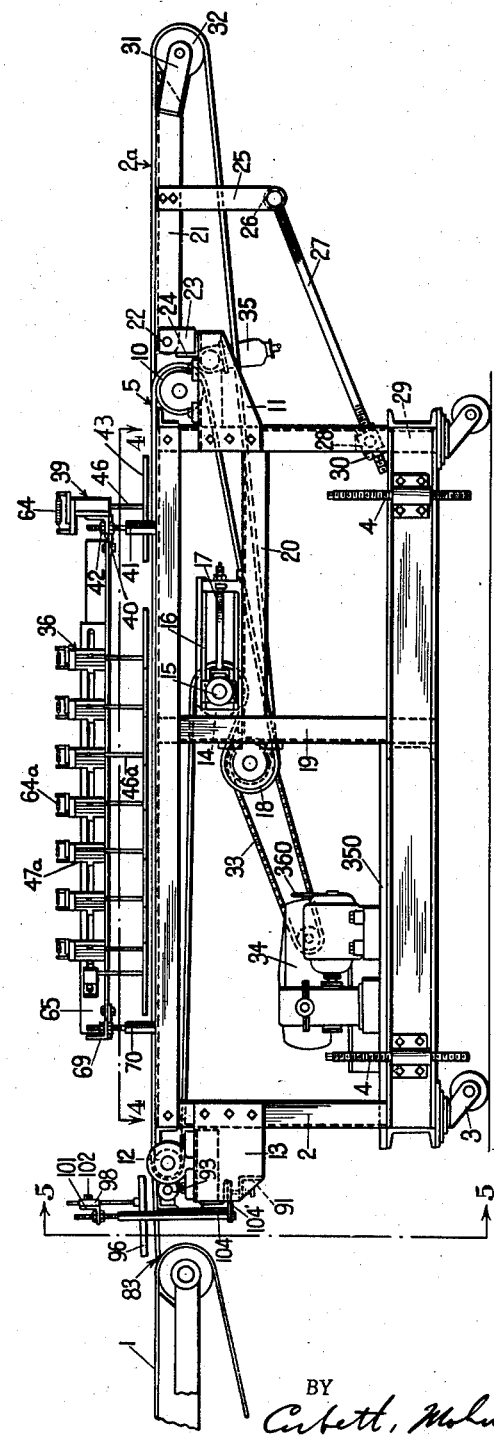
Figure 1 is a side elevational view of a lehr-loading apparatus constructed according to our invention.
Figure 2:
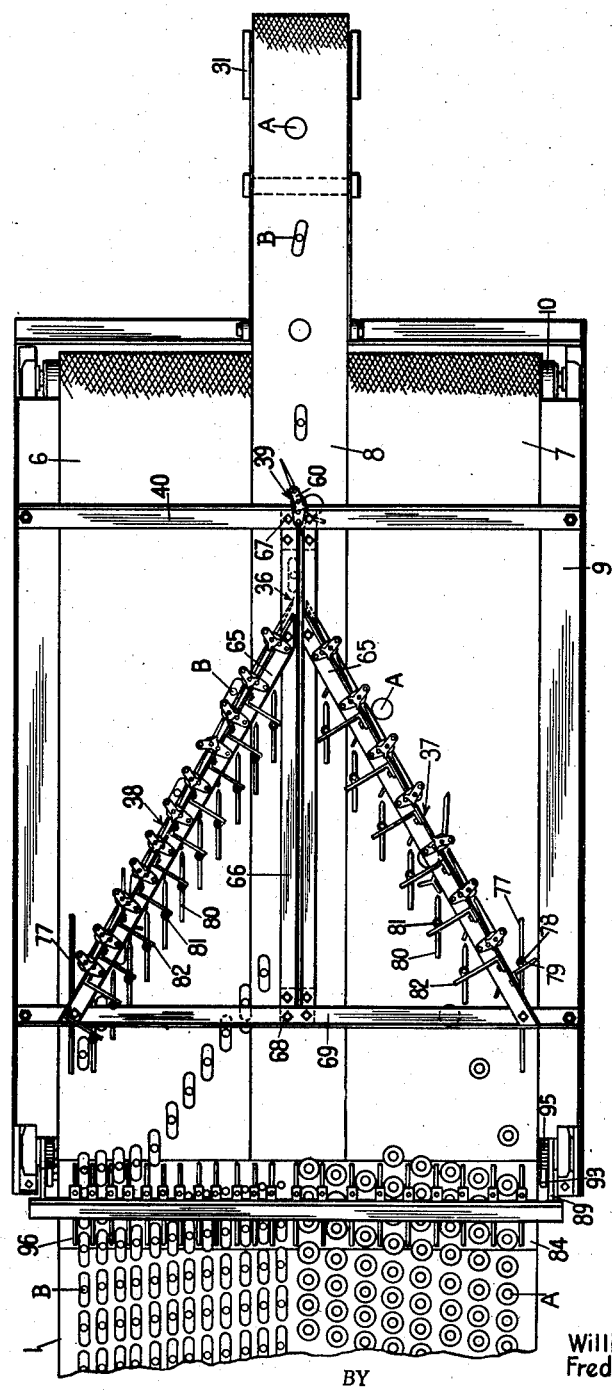
Figure 2 is a top plan view of the apparatus shown in Figure 1.
Figure 3:
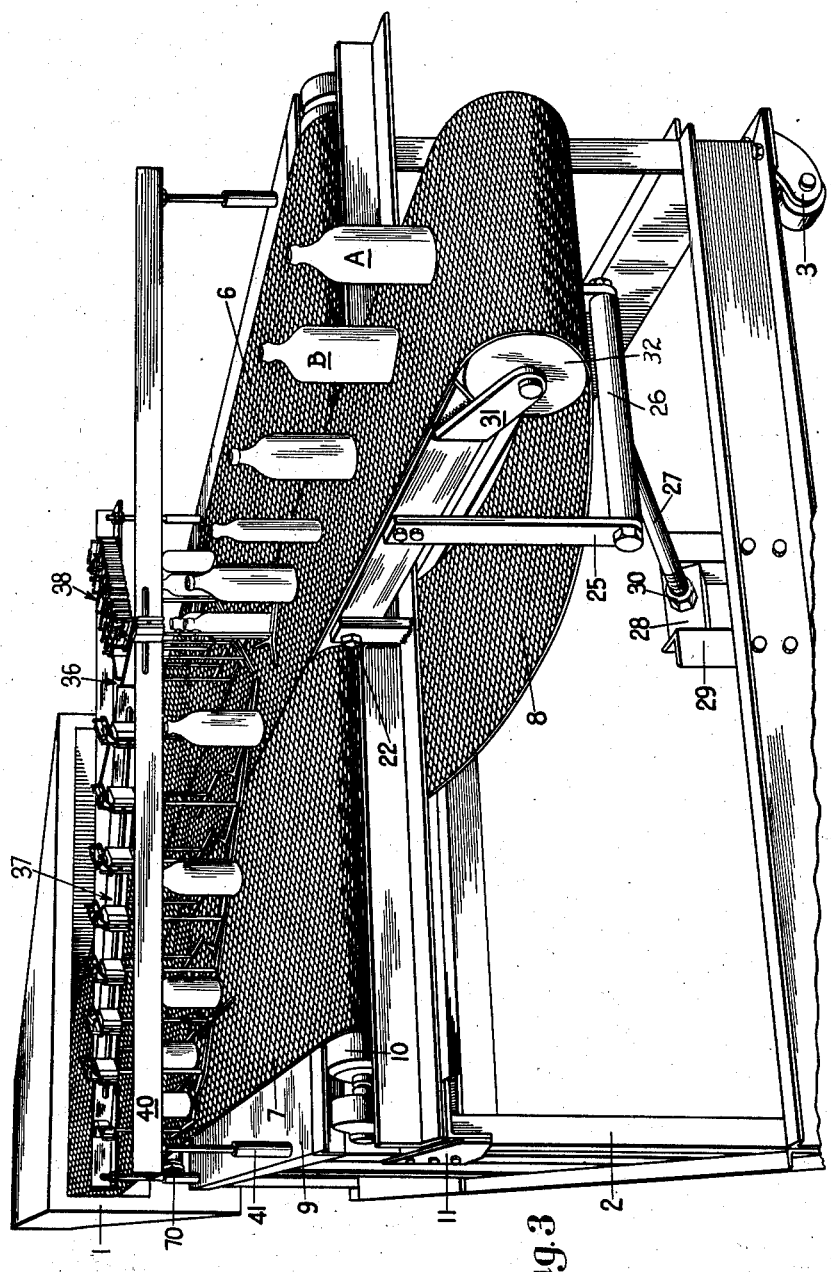
Figure 3 is a perspective view of our apparatus.

Our apparatus, as shown in Figures 1, 2 and 3, comprises a frame 2 fabricated from suitable channel beams and angle irons. The frame 2 is made portable by means of pivoted casters 3 disposed at each of the lower corners thereof. Adjacent each caster is a screw jack 4 supported by the frame. By manipulating the jack 4, the casters 3 will be lifted from the surface, and the frame will be supported immovably in a fixed position by the jack 4. Thus, by proper adjustment of the jacks 4, the frame may be made portable or may be held in any fixed position. Furthermore, the height of the frame relative to the lehr may be adjusted by means of the jacks 4.

On the upper end of the frame 2, the conveyer unit 5 is disposed. This conveyer unit is of the endless belt type and the frame 2 will be so related to the lehr that the conveyer will extend and move in the same direction as the lehr conveyer 1. Furthermore, the jacks 4 will be so adjusted that the conveyer unit 5 will be disposed just slightly higher than the conveyer 1.

The conveyer unit 5 consists of side conveyer belts 6 and 7 and an intermediate conveyer belt 8. All of these conveyer belts are of the endless type. The upper flight of each of these belts passes over a horizontally disposed plate 9 which is supported on the upper end of the frame 2 and extends for the full width and length thereof. Thus, the upper flight of the belts 6, 7 and 8 are disposed in the same horizontal plane and the belts are disposed side by side with their adjacent edges close to each other. The belts are preferably made of wire mesh material of the same nature as that usually provided for the lehr conveyer 1. The belt 6 is of the same width as the belt 7 but the belt 8 is of substantially less width.

A transversely extending belt-supporting roller 10 is disposed at one end of the frame 2 and is rotatably carried by brackets 11 extending outwardly therefrom adjacent the upper and thereof. The top surface of the roller 10 will be at substantially the same level as the top surface of the plate 9. This roller extends the full width of the frame 2. At the other end of the frame 2, a transversely extending belt-supporting roller 12 is provided. This roller also extends the full width of the frame and is rotatably carried by brackets 13 extending from the frame. These brackets are secured to the end of the frame adjacent the upper portion thereof and rotatably support the roller 12 in such a manner that its upper surface will be at substantially the same level as the upper surface of the plate 9.

An adjustable belt-supporting roller 14 is carried by the frame 2 at a point intermediate the length of the frame and at a point spaced below the top plate 9 of the frame. This roller 14 extends transversely the full width of the frame and is rotatably carried by bearing members 15 which are mounted for longitudinal movement in guideways 16. These guideways 16 are supported by the frame and extend longitudinally thereof. The bearing members 15 are adjusted longitudinally of the guideways 16 by means of adjusting screws 17. At a point spaced slightly below the roller 14 and spaced slightly to the left thereof (Figure 1) is another transversely extending roller 18 which extends the full width of the frame. This roller is rotatably carried by bearing members secured to vertical supports 19 which together with horizontal supports 20 also function to support the guides 16.

The right-hand end (Figure 1) of the frame 2 is provided with an extension 2a. This extension comprises a pair of angle members 21 which have their inner ends pivotally connected as at 22 to upstanding brackets 23 supported by frame 2. These brackets 23 are carried by a transversely extending angle iron 24 (Figure 1) which extends the full width of frame 2 and is secured to the upper edges of brackets 11 adjacent the outer ends thereof. The members 21 have bars 25 rigidly secured thereto at their upper ends. The lower ends of these bars rotatably carry a shaft 26. This shaft 26 has the outer and upper end of a rod 27 rigidly secured thereto. This rod 27 has its lower threaded end passing loosely through a block member 28 (Figure 3) which is pivotally mounted between a pair of upstanding angle brackets 29 carried by the lower portion of the frame 2. By means of lock nuts 30 disposed on the threaded portion of rod 27 on opposite sides of the block 28, the rod 27 may be adjusted longitudinally relative to the block. By means of this adjustment, the members 21 may be adjusted into exact horizontal position. The outer ends of the members 21 carry inclined brackets 31 which rotatably support a belt-supporting roller 32. The upper surface of this roller 32 is at substantially the same level as the members 21.

The endless belts 6 and 7 pass along the plate 9, over and downwardly around the roller 12, underneath the plate 9, over and downwardly around the roller 14, back to the roller 18, downwardly around the roller 18 and then upwardly to the roller 10 and finally upwardly around this roller over the plate 9. The intermediate belt 8 passes horizontally along the extension 2a of the frame, along the top plate 9 and follows in the same path as the other belts until it passes beyond the roller 18. Then it passes upwardly and outwardly to the roller 32 and then upwardly over this roller. It will be apparent that by adjusting the roller 14 along the guides 16, the tension of all the belts 6, 7 and 8 can be adjusted simultaneously.

The belts 6, 7 and 8 are driven continuously and simultaneously at the same rate of speed by means of a chain and sprocket drive 33 extending to roller 18 from a combination gear-reducing and motor unit 34. This unit 34 is supported on a horizontal plate 350 carried by the lower portion of the frame 2. This unit 34 is of the variable speed type and may be regulated by a handwheel 360. The unit 34 will, consequently, serve to drive the conveyer belts 6, 7 and 8 continuously at the desired speed. The speed of movement of these belts will be considerably greater than that of the lehr conveyer belt 1.

In order to heat the belts 6, 7 and 8 to prevent them from chilling the glassware to be supported thereby, a burner unit 35 is provided. This burner unit is illustrated diagrammatically in Figure 1. It is preferably of a ribbon type that extends the full width of the frame and is supported by members 11 in such a manner that the flame thereof will strike the roller 10. The roller 10 will be heated and will transmit the heat to the belts 6, 7 and 8.

The extension or outwardly projecting portion of the conveyer belt 8 is adapted to receive the ware either directly from a forming machine or from a forming machine conveyer. The belt 8 will receive this ware in such a manner that it will be supported thereon in a single file. The ware will be conveyed by the continuously moving belt 8 to the article-guiding and arranging unit, shown as a whole at 36. This unit 36 will function to arrange the ware in a plurality of longitudinally extending closely laterally spaced rows of ware on the conveyer belts 6, 7 and 8.

The unit 36 shown in Figures 1 to 5, inclusive, is of a type suitable for separating two different types of ware which is supplied to the conveyer 8. These types of ware will be designated A and B and it is to be understood that they may differ from each other in shape or some other characteristic. The unit 36 is divided into two sub-units 37 and 38, as shown in Figure 2. The unit 37 is adapted to receive and arrange the articles of type A ware while the unit 38 is adapted to receive and arrange the articles of type B of the ware. The units 37 and 38 are disposed transversely of the conveyer belts and at an angle to the path of movement thereof. Their right-hand ends (Figure 2) or forward ends converge and their rear ends diverge to points adjacent the outer edges of the conveyer belts 6 and 7.

To separate the articles supplied to the conveyer belt 8 so that articles A will be supplied to unit 37 and articles B will be supplied to unit 38, we provide a pivoted gate structure 39. This structure 39 is carried by an angle bar 40 which extends transversely of the conveyer unit at a point spaced thereabove a sufficient distance to permit the article to pass therebeneath (Figures 1 and 2). This bar 40 extends the full width of the frame and has its outer ends carried on the upper ends of posts 41. These posts 41 are supported by plate 9 adjacent the outer edges thereof. The upper ends of the posts are threaded and pass loosely through openings in member 40. The threaded portion of members 41 carry nuts 42 above and below member 40. By adjusting these nuts, the height of member 40 relative to the conveyer belts may be adjusted.

Figure 4:
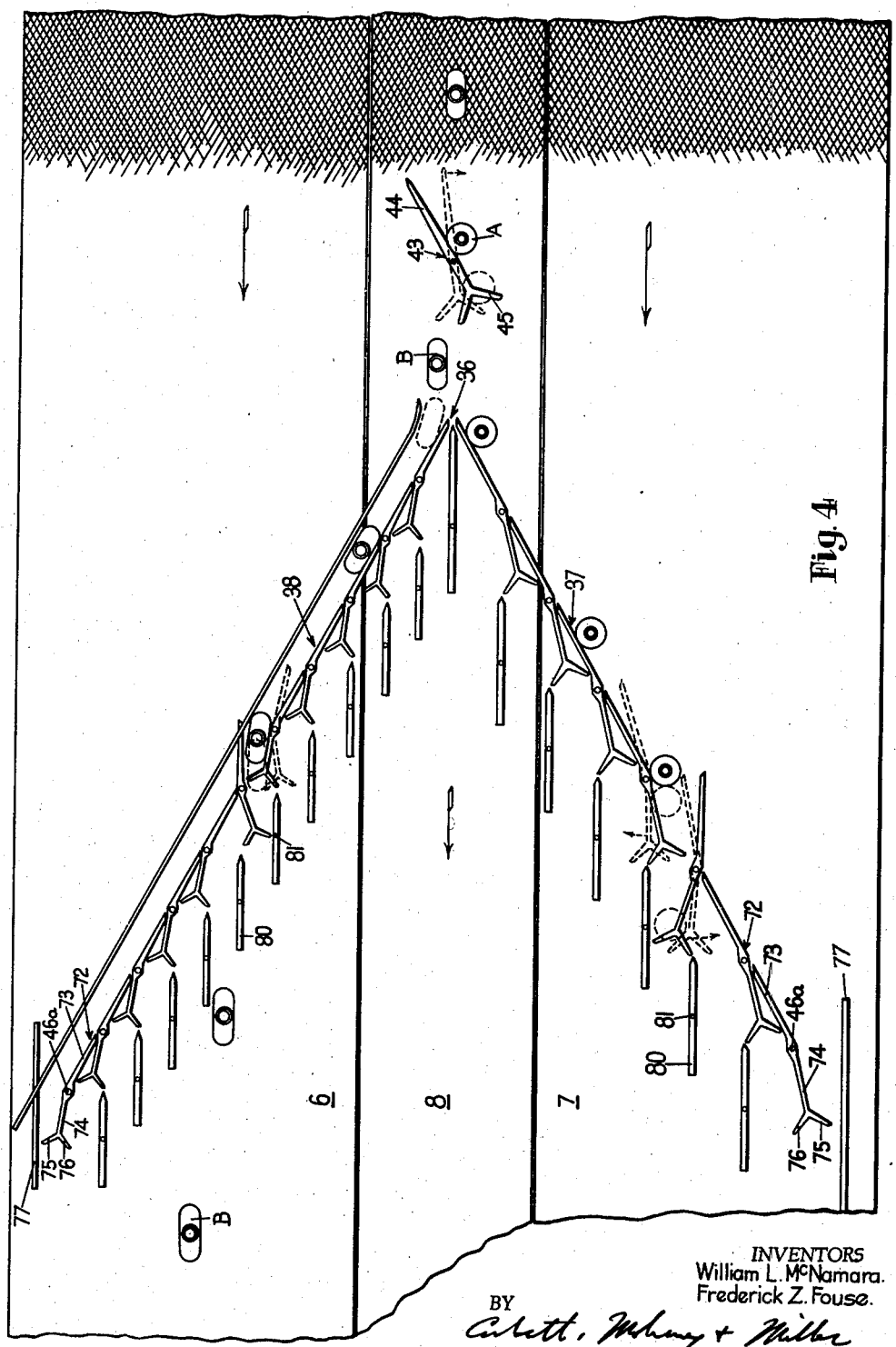
Figure 4 is a horizontal sectional view taken substantially along line 4—4 of Figure 1.
Figure 5:
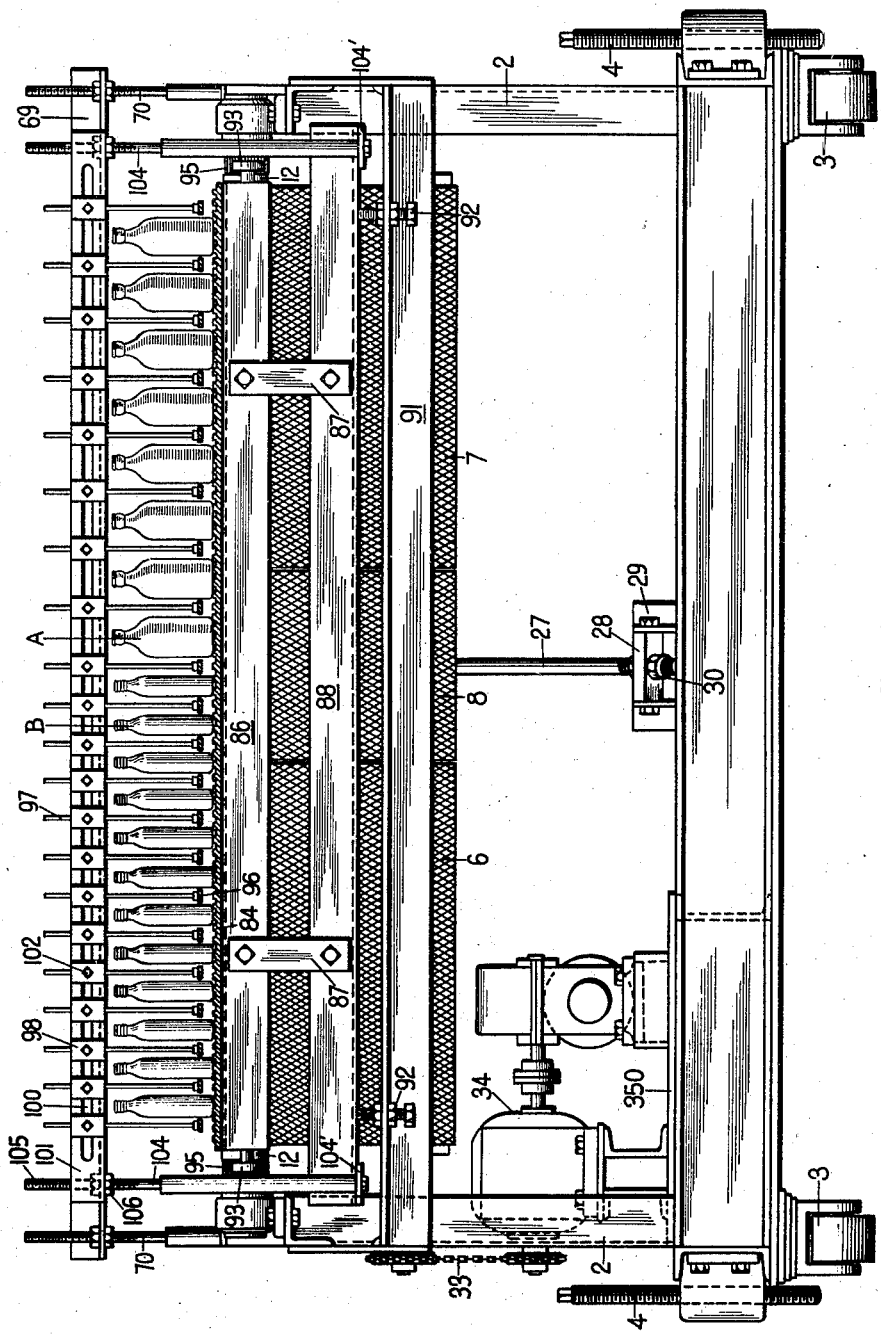
Figure 5 is a vertical sectional view taken substantially along line 5—5 of Figure 1.
Figure 6:
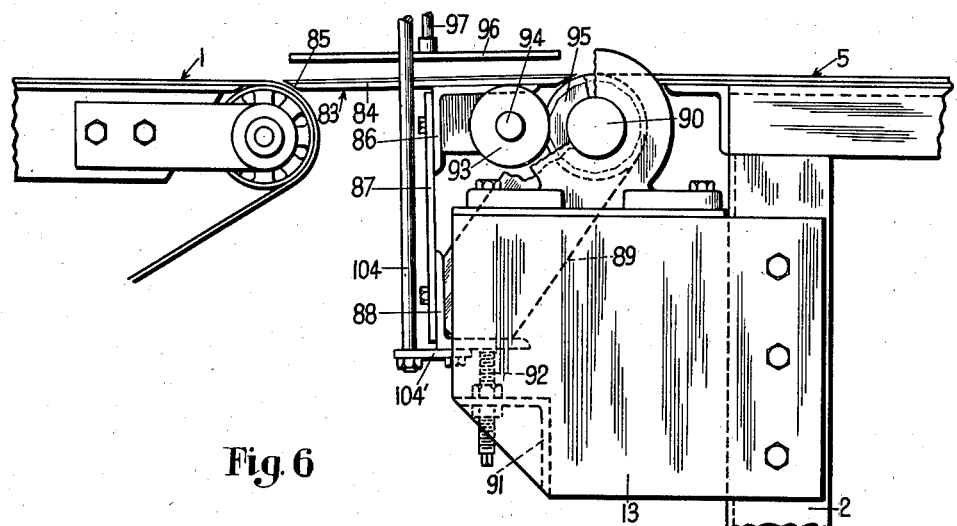
Figure 6 is a detail, mainly in side elevation, partly broken away, of a transferring unit of the vibrating plate type for transferring articles from the lehr loader conveyer to the lehr conveyer.
Figure 7:
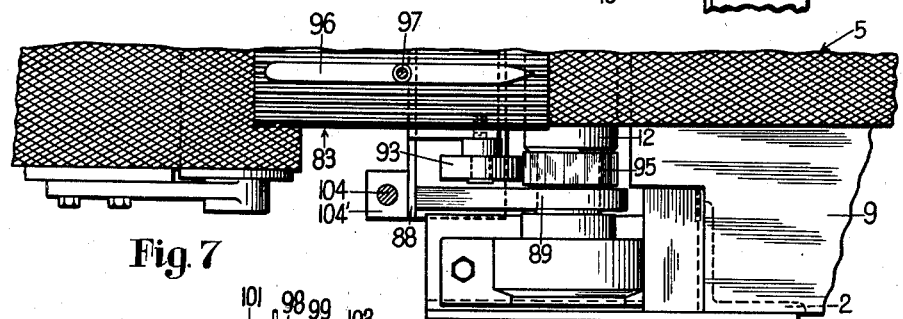
Figure 7 is a top plan view of a portion of the unit illustrated in Figure 6.
Figure 9:
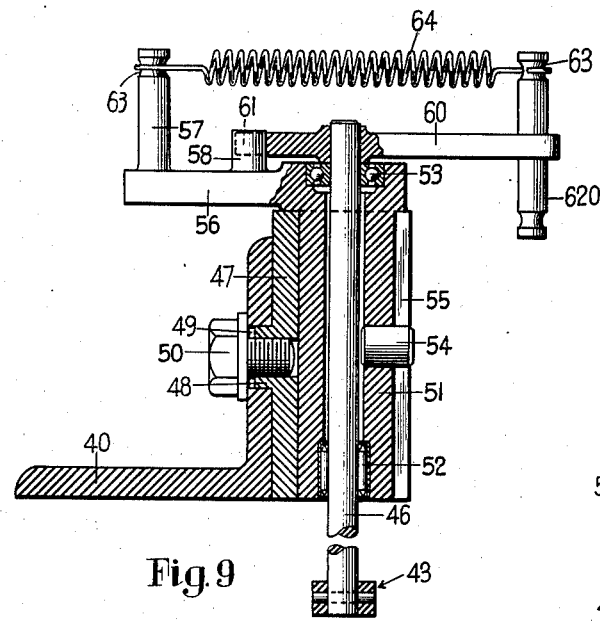
Figure 9 is a detail, in vertical section, illustrating mechanism which we provide for controlling each gate.
Figure 11:
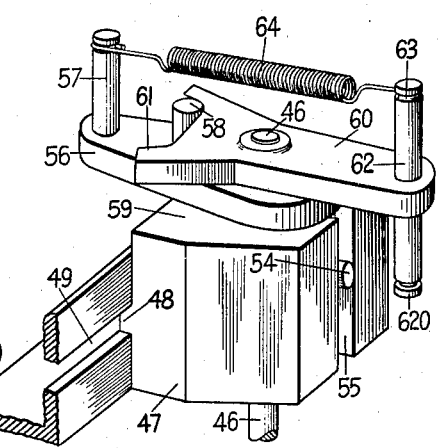
Figure 11 is a perspective view of the mechanism shown in Figure 9.

The gate unit 39 embodies a gate member 43 which, as shown, is Y-shaped having a single forwardly disposed article-guiding portion 44 and a pair of rearwardly disposed gate-moving portions 45 which diverge rearwardly (Figure 4). The gate member 43 is keyed on the lower end of a shaft 46 (Figure 1) which supports it. This shaft 46 has its upper end rotatably supported in a block member 47 which is illustrated best in Figures 9 and 11. The block 47 includes a guide portion or key 48 which extends into a slot 49 extending longitudinally in the vertical portion of angle member 40. A clamping screw and nut member 50 passes through slot 49 and is threaded into block member 47. When this bolt member 50 is loosened, the block member 47 may be adjusted longitudinally of slot 49. When member 50 is tightened, the member 47 will be tightly clamped in position. Thus, the shaft 46 which carries gate member 43 may be moved to an exact position midway between the edges of the belt 8.

The upper end of the shaft 46 is rotatably mounted within a sleeve member 51 by means of a roller bearing assembly 52 disposed within the lower end of member 51 and a ball bearing assembly 53 disposed within the upper end thereof. The sleeve 51 is non-rotatably held within a socket in the block member 47 by a dowel pin 54 disposed in an opening in member 51 and extending into a vertical slot 55 formed in member 47. The upper end of the sleeve 51 is provided with a lateral integral extension or projection 56. This extension 56 is provided with a pin 57 located on the outer end thereof. The extension 56 also carries a stop member or pin 58 which is located inwardly from pin 57. The members 57 and 58 are in alignment with each other and the member 58 is of considerably less height than the member 57. The lateral extension 56 rests upon the upper surface 59 of block member 47, see Figures 9 and 11.

Keyed to the extreme upper end of the shaft 46 is an oscillatable arm or member 60. This arm is keyed to the shaft intermediate the ends of the arm and is disposed above the member 56. Its inner end is bifurcated or provided with a notched portion 61 which cooperates with stop pin 58 to limit the swinging movement of the member 60. Its outer end carries an upstanding pin 62. The pins 62 and 57 have their upper ends at the same level and have grooves 63 formed therein around which the ends of a tension spring 64 are passed. If desired, the arm 60 may be provided with a second pin 620 which depends from the member and, as shown, is in alignment with pin 62.

The spring 64 will tend to keep the gate member 43 in any position to which it is moved and will aid in moving it into such position after movement is initiated by the article. In operation, as shown best in Figure 4, the successive articles contacting the gate member will swing it from one side to the other. For example, if the guiding portion 44 thereof is at the position indicated in full lines in Figure 4, the article A will contact therewith and, since it is being moved along with the conveyer belt 8, it will be deflected laterally toward the unit 37. As the article moves along the gate and passes beyond the shaft 46, which supports the gate, it will eventually strike one of the gate-operating portions 45. This will cause the gate to be swung to the opposite side, as shown by the dotted line in Figure 4. The portion 44 thereof will then be at the opposite side of the pivot point so that it will engage the next successive article B and deflect it toward the unit 38. Thus, the gate will be moved from one side to the other by the article which it guides to the different units 37 and 38.

When the gate is swung to one side or the other, the shaft 46 rotates the member 44 and swings the arm 60 to the corresponding side. This throws the pin 62 off center relative to the pin 57. Consequently, spring 64 will tend to hold the arm 60 and, consequently, the gate 43 in such position. The extent of movement of the gate will be limited by the notched portion 61 cooperating with pin 58 of member 56. The spring 64 will be of sufficient strength to normally prevent accidental movement of the gate which might be caused by vibration of the apparatus or by some other factor. However, the spring is not of sufficient strength to interfere with the easy movement of the gate to its two different positions by contact of the articles therewith. The gate will be extremely light and will be supported closely adjacent but not in contact with the moving belt, as seen in Figure 1. Consequently, the gate will be readily swung into its different positions by the articles without danger of upsetting the articles. The conveyer belt 8 will move at a comparatively high rate of speed so that the gate will be actuated efficiently.

The article-guiding and arranging units 37 and 38 are of identical construction. They are supported by horizontally disposed angle members 65 (Figures 1 and 2) arranged in the form of a V with the vertex forward or at the right-hand end, as shown in Figures 2 and 4. The angle members 65 have their forward converging ends secured to a longitudinally extending support 66. This support 66 is disposed midway between the edges of the conveyer unit and has its forward end bolted to the angle member 40 as at 67. The rear end of this member 66 is bolted, as at 68, to a transversely extending angle member 69 which is disposed parallel to member 40 but adjacent the opposite end of the frame (Figure 2). The member 69 extends the full width of the frame and is supported on posts 70 which are the same as the posts 41, see Figure 1. By adjustment of the nuts carried by the posts 41 and 70, the height of the units 37 and 38 and the gate unit 39 may be adjusted simultaneously. It will be noted that the rear or outer ends of the angle members 65 are disposed substantially at the outer edges of conveyer belts 6 and 7.

Figure 10:
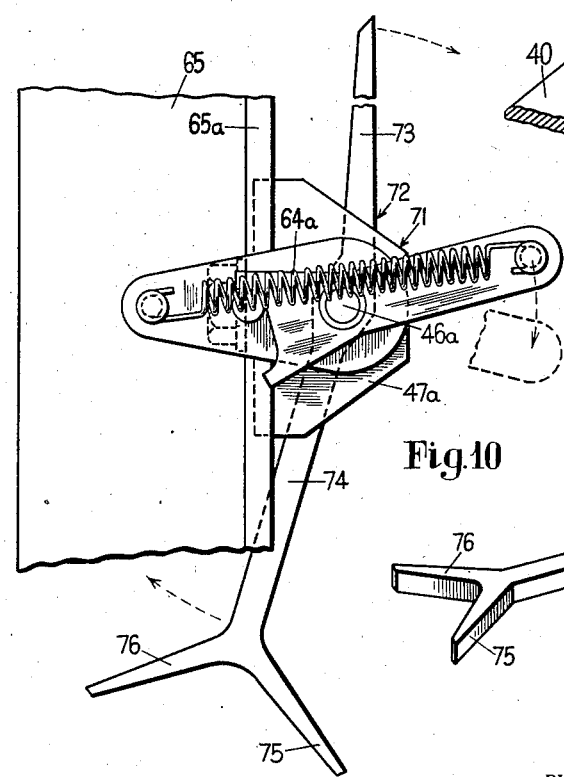
Figure 10 is a top plan view of a gate and the controlling mechanism shown in Figure 9.

Each of the units 37 and 38 consists of a plurality of gate units, shown as a whole at 71, Figure 10. The supporting structure and control mechanism for each of the gate units 71 is identical with that described in connection with the gate unit 39. Each gate member 72 is supported on the lower end of a shaft 46a the upper end of which is rotatably supported in a block 47a in the manner previously described. The blocks 47a are supported on the member 65 which is provided with a longitudinally extending slot 65a which extends substantially the full length thereof. Thus, the members 47a may be adjusted longitudinally of the member 65 to properly position the gates 72 relative to each other. An off-center spring control mechanism 64a like that previously described is provided for controlling each of the gates.

Figure 12:
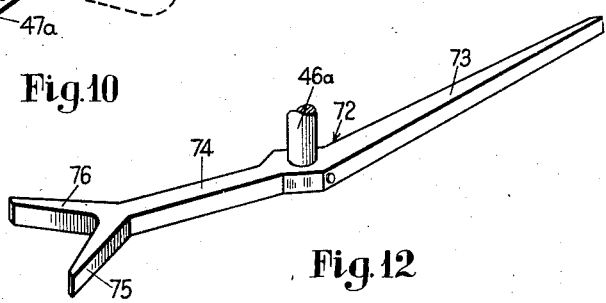
Figure 12 is a perspective view of one of the gates.

Each of the gate members 72 is of the shape illustrated best in Figures 10 and 12. It comprises an article-guiding portion 73 disposed on one side of shaft 46a and a gate-actuating portion 74 disposed on the opposite side of the shaft 46a. The portion 73 is disposed at a slight angle relative to the portion 74. The portion 74 is Y-shaped and includes a gate-opening finger 75 and a gate-closing finger 76.

Before any articles are fed to the units 37 and 38 by the conveyer belt 8, all of the gates 72 will be in closed position, as shown in full lines, Figure 4. In such position, the article-guiding portions 73 of the gates of each of the units 37 and 38 will serve to produce a continuous article-guiding surface extending from a point at the middle of conveyer belt 8 to a point at the outer edge of the conveyer belt 6 or 7. Thus, when an article is guided to the inner or forward end of either of such units, for example, when an article A is guided to the inner end of unit 37 (Figures 2 and 4), it will contact with this continuous article-guiding surface. Since the conveyer belts 7 and 8 will be moved continuously at a fairly high rate of speed, the article being carried by the moving belt contacts the continuous guiding surface and will be moved by such stationary guiding surface laterally outwardly on the moving conveyer belt. The force of the article against portions 73 of the closed gates, due to friction of the moving belts with the bottoms of the articles, will keep the gates closed. The article will continue to contact with the continuous guiding surface until the outermost gate 72 is reached. When this gate is reached, the article will pass beyond the pivot point of the gate and into contact with the gate-operating portion 74. The article will contact the opening portion 75 of the gate and will swing the portion 74 of the gate inwardly toward the center of the conveyer. The gates 72, like the gate 43, will be supported closely adjacent the conveyer belt but not in contact therewith. The friction of the bottom of the article against the conveyer belt will be sufficient to overcome resistance of the outermost gate to movement by the first article. Opening of the outermost gate in this manner will swing the article-guiding portion 73 thereof outwardly toward the outer edge of the conveyer belt 7. While in this position the portion 73 of such gate will not act as an article-guiding portion. The first article will at this time be disposed adjacent the outer edge of belt 7 and will be moved on beyond the gate. The next article which comes along will move along the continuous article-guiding surface, formed by portions 73 of the closed gate, until the space opened by the portion 73 of the outermost gate is reached. At this time, the second article will pass through such space. In passing through such space, the second article will be continuously in contact with the second gate and will not contact with the portion 73 of the first gate. The second article will pass around the pivot point of the second gate and when it engages portion 74 thereof will start to open the second gate. The opening of this second gate will be continued by contact of the article with the gate-opening finger 75 until the outermost end of this finger has been moved to a point in line with the pivot point of the gate. As the second article is moved on by the conveyer belt, it will contact the gate-operating portion 74 of the first or outermost gate and will start to close such gate, eventually contacting the closing finger 76 and swinging the outermost gate into closed position. At this time, the innermost point of the finger 76 of the outermost gate will be substantially in line with the pivot point of such gate. The second article will then be moved further along beyond the second gate by the conveyer belt. The same operation will be repeated in connection with each of the succeeding gates until the innermost gate has been closed, after having been opened to permit the passage of an article. The continuous guiding surface will have been formed again by the portions 73 of all the gates and the next article supplied to this unit will again move to the outermost gate.

Thus, it will be apparent that each of the units 37 and 38 will function to arrange the articles, supplied by the conveyer belt 8, into longitudinal rows of longitudinally spaced articles. These rows will be spaced close together laterally of the conveyer unit. The gates of each of the units 37 and 38 are opened automatically by articles supplied thereto. Each article passing through a space opened by portion 73 of one gate will contact with the gate-opening finger 75 of the succeeding gate and the gate-closing finger 76 of the preceding gate. Accidental movement of the gates into different positions will be prevented by the spring units 64a. However, these spring units will not prevent ready operation of the gates by contact of the articles therewith.

A guard member (Figures 2 and 4) may be disposed in spaced relationship to the outermost gate. This member 77 will extend longitudinally of the conveyer belt. It may be supported by a rod 78, see Figure 2, which has its upper end rigidly secured to a bracket 79 carried by member 65. The guard member 77, one of which is provided for each of the units 37 and 38, will prevent accidental displacement of articles off the edge of the conveyers 6 and 7. However, it will be so spaced from the outermost gate that the article contacting the outermost gate and moving along the gate will not contact with member 77. The adjacent gate units 71 will be so adjusted relative to each other that their pivot points 46a will be spaced apart sufficiently so that an article, contacting with the succeeding gate and passing around the pivot point thereof, will not contact with or be deflected by the open portion 73 of the preceding gate. In alignment with each of the shafts 46a and at a point spaced behind such shaft at a distance sufficient so as not to interfere with the operation of the gate, is a longitudinally extending guard member 80 (Figures 2 and 4). The ends of fingers 75 and 76 of the cooperating gate will alternately be in alignment with the forward end of the guard member 80. Each of the guard members 80 is carried on the lower end of a rod 81 which has its upper end rigidly secured to a bracket 82, see particularly Figure 2. This bracket 82 is secured to member 65. The guards 77 and 80 will be parallel to each other and will be supported closely adjacent the conveyer belt but not in contact therewith. The bracket 82 and the bracket 79 are supported on member 65 by bolts extending through the slots 65a thereof. Consequently, the guards may be adjusted longitudinally relative to member 65 to properly position them relative to the gate units 71. Each of the guards 77 will function to prevent the article from being deflected laterally inwardly when it contacts the gate-closing finger 76 of the preceding gate.

Thus, the unit 37 will arrange the articles A supplied thereto in longitudinally extending rows on a portion of the belt 8 and on the belt 7. The unit 38 will arrange the articles B in longitudinally extending rows on a portion of the belt 8 and on the belt 6. The gate unit 39 will function to guide the articles A to the unit 37 and the articles B to the unit 38.

When the articles pass beyond the units 37 and 38, they are carried along by the conveyer belts to a point at the end of the conveyer unit. At this location it is necessary to provide a transferring unit for transferring the articles from the relatively fast moving lehr loader conveying unit 5 to the relatively slowly moving lehr conveyer belt 1. This transferring unit may take various forms but is preferably of such a nature that as the articles leave the lehr loader conveyer their movement toward the lehr conveyer 1 is retarded so that the longitudinally spaced articles of each row will be brought closer to each other.

In Figures 1, 2, 5, 6, 7 and 8, we have illustrated one type of transferring unit which we may provide. This unit is illustrated generally by the numeral 83. The conveyer unit 5 is preferably as wide or wider than the lehr conveyer unit 1. The units 37 and 38 are of sufficient extent that the unit 1 will be supplied with longitudinal rows of articles throughout the full width thereof. The unit 83 will extend the full width of the unit 1 and is disposed between the unit 1 and the unit 5. As previously pointed out, the unit 5 is preferably slightly higher than the unit 1.

The article-transferring unit 83 comprises a grill 84 which bridges the space between the conveyer units 1 and 5. The grill 84 is preferably so supported that it is inclined downwardly slightly toward the unit 1. The grill 84 has its edges adjacent the units 1 and 5 bevelled as at 85 (Figure 6) so that it will fit up closely adjacent to the belts of these units. The grill 84 is carried by a transversely extending angle member 86 (Figures 5 to 8). This angle member is supported on the upper ends of vertically disposed leaf springs 87 disposed at transversely spaced points along the angle member. The lower ends of these leaf springs are secured to a transversely extending angle member 88 which is disposed parallel to member 86 but at a lower level. The ends of member 88 are secured to the lower ends of supporting arms 89. Each of these arms 89 extends forwardly and upwardly and its upper end is mounted for pivotal movement about a shaft 90 which supports the roller 12 of the conveyer unit 5. The member 88 is spaced above an angle member 91 which extends transversely of the frame 2 for the full width thereof and the ends of which are rigidly secured to the brackets 13. The member 91 carries a plurality of adjusting screws 92 threaded upwardly therethrough. The member 88 will rest on these screws. It will be apparent that by adjusting screws 92, the member 88 may be raised or lowered, the arms 89 swinging about the axis of shaft 90. Thus, the grill 84 may be inclined to any degree relative to the conveyer unit 5.

The grill 84 is adapted to be vibrated so that the articles moved thereon by the conveyer unit 5 will creep down the grill onto the conveyer unit 1. This vibration is accomplished by means of a roller 93 supported at each end of the member 86 by means of a stub shaft 94 suitably mounted thereon. The roller 93 is in contact with a vibrating roller 95 which is carried by the shaft 90 and is keyed thereon so that it rotates when the roller 12 rotates. The rollers 93 and 95 are of such size that when they are in contact the leaf springs 87 are flexed slightly so that they will maintain these rollers in resilient contact. The vertical adjustment of the grill by means of screws 92 will not interfere with contact of rollers 93 and 95. It will be apparent that when the rollers 95 are rotated due to their rough periphery, they will vibrate the rollers 93 and flex the springs 87 back and forth. This will produce a vibration of the grill 84 and cause the articles supplied thereto to creep down such grill onto the conveyer 1.

Figure 8:
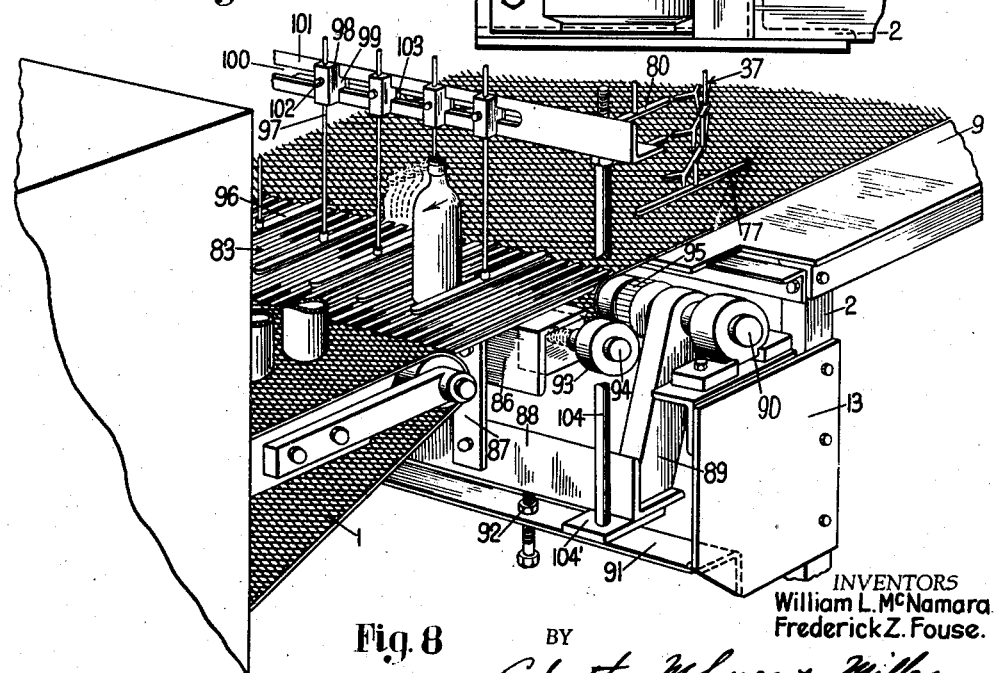
Figure 8 is a perspective view, partly broken away, illustrating the unit shown in Figures 6 and 7.

Associated with the grill 84 in laterally spaced relationship are longitudinally extending guide members 96. These guide members 96 are so arranged that they form guide passageways equivalent in number and location to the spaces controlled by gates 71 of the units 37 and 38. Each of the guide members 96 is keyed on the lower end of a rod 97. Each rod 97 extends vertically through a bore or sleeve formed in a block member 98. Each block member 98 is provided with a tongue portion or projection 99 extending into a longitudinal slot 100 formed in a supporting angle member 101. The rods 97 are vertically adjustable in members 98 and may be held in adjusted position by setscrews 102. The blocks 98 may be adjusted along the slot 100 in member 101 and may be held in fixed position by means of clamping units 103 (Figure 8). The supporting member 101 has its outer end supported on the upper ends of upstanding posts 104. These posts have threaded upper portions 105 which carry nuts 106 above and below the member 101. By adjusting these nuts the distance of member 101 above the grill 84 may be adjusted. The lower ends of the posts 104 are carried by brackets 104' which are secured to the lower surface of member 88. Thus, when member 88 is vertically adjusted, the guide-supporting member 101 moves therewith.

It will be apparent that this article-transferring unit 83 will receive the articles from the unit 5 and will retard movement of the articles so that they will be brought closer to each other as they are supplied to the unit 1. Vibration of the grill 84 will serve to cause the articles to be positively moved down the grill onto the receiving conveyer 1.

It will be apparent that with this arrangement, the articles A and B will be separated by the gate unit 39. Then the articles will pass to the units 37 and 38 where they will be arranged in laterally spaced longitudinal rows. Then they will be carried by the unit 5 to the transferring unit 83 which will serve to move the articles of each row closer to each other as they are transferred to the lehr conveyer 1. On the lehr conveyer, as shown in Figure 2, the articles A and B will be in separate groups, each consisting of longitudinally extending straight rows and transversely extending rows which we disclose at a slight angle relative to the path of movement of the lehr conveyer. Thus, the articles will be disposed closely adjacent each other in the lehr so as to obtain maximum efficiency of the lehr. Furthermore, since the articles A and B are in separate groups, inspection and packing of them will be facilitated.

The units 37 and 38 may be used with any lehr conveyer less than the width of the unit 5 merely by removing some of the gate units 71 to correspond to the width of the unit 1. The units 37 and 38 will handle articles, regardless of height, up to a maximum corresponding to the highest position to which the members 65 may be adjusted. Furthermore, the gate units 71 may be spaced apart different distances so that articles of widely varying transverse dimensions can be handled. In fact, either of the units 37 and 38 can handle varying width articles at the same time. The gates will be opened and closed in the manner indicated regardless of the shape of the articles.

Figure 13:
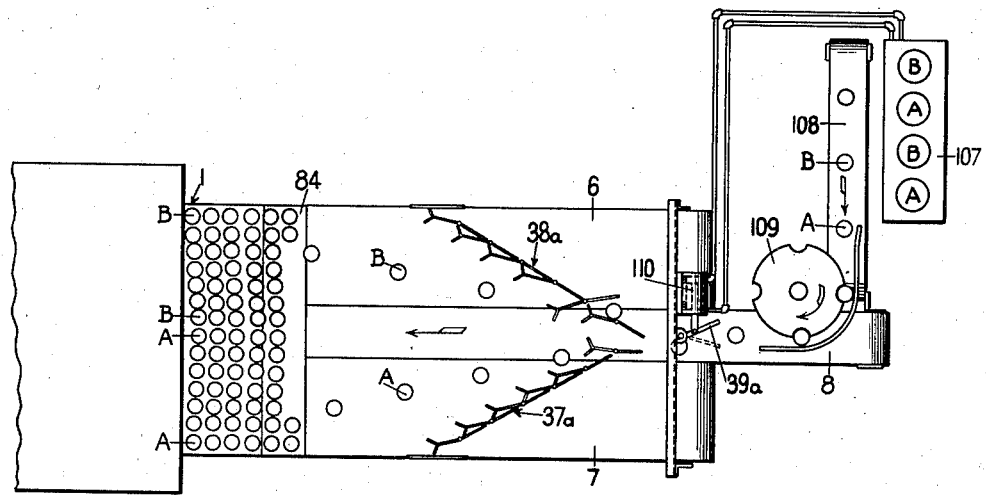
Figure 13 is a top plan view illustrating an arrangement which we may provide for separating into groups two types of articles produced on a single forming machine.

In Figure 13, we illustrate an arrangement which may be provided for receiving two different types of ware A and B formed on a single forming machine illustrated diagrammatically and designated by the numeral 107. The articles formed on the machine 107 are removed and placed on a continuously moving conveyer 108. They are conveyed to a point adjacent the extension of the conveyer belt 8 where they are transferred from the belt 108 to the belt 8 by a starwheel transfer unit 109 or other suitable transfer unit. In this illustration we have illustrated a gate unit 39a for separating the articles A and B which is positively actuated by a cylinder and piston unit 110. This cylinder and piston unit 110 is preferably actuated by air and may be controlled from the usual type of timer provided for controlling the forming machine 107. Thus, the gate 39a will be positively moved by the unit 110 at timed intervals so as to first direct an article A laterally in one direction and then direct an article B laterally in the opposite direction. With this gate arrangement, even though an article A or B is missing when it reaches the gate, the separation of articles A and B into groups will not be affected.

Figure 14:
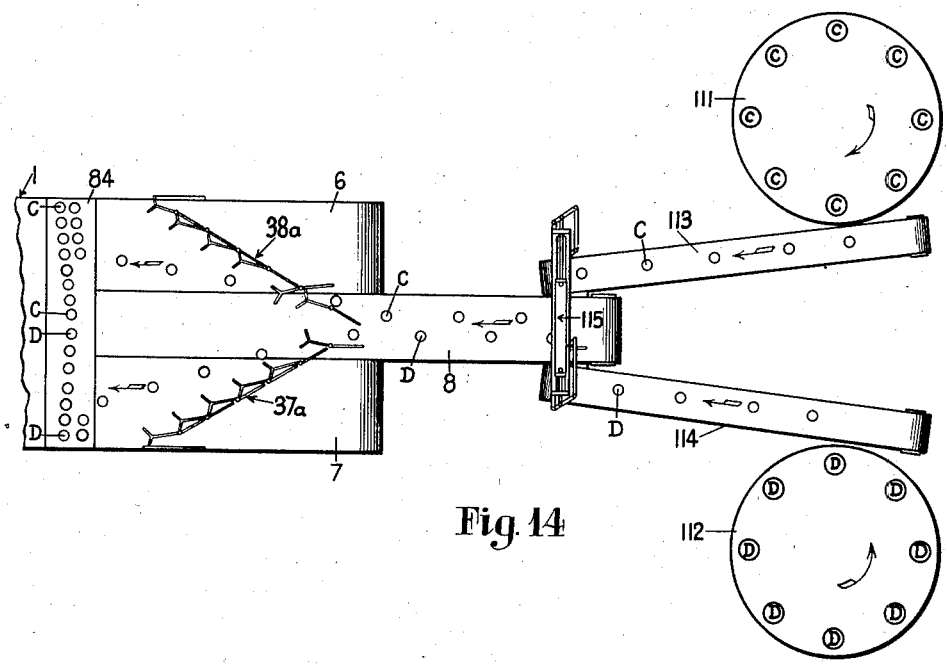
Figure 14 illustrates an arrangement which we may provide for receiving articles from two separate forming machines and transferring them to the article-guiding and arranging unit.

In Figure 14, we illustrate an arrangement which may be provided for receiving different types of articles from two different forming machines. Thus, we have illustrated diagrammatically a forming machine 111 which produces articles C and a forming machine 112 which produces articles D. A conveyer 113 receives the articles from the machine 111 and a conveyer 114 receives the articles from the machine 112. These conveyers 113 and 114 converge toward each other and overlap the end of conveyer 8. A unit 115 is provided for sliding an article C from the conveyer 113 onto the conveyer 8 and then sliding an article from conveyer 114 onto the conveyer 8 and repeating this operation in rapid sequence.

Figure 31:
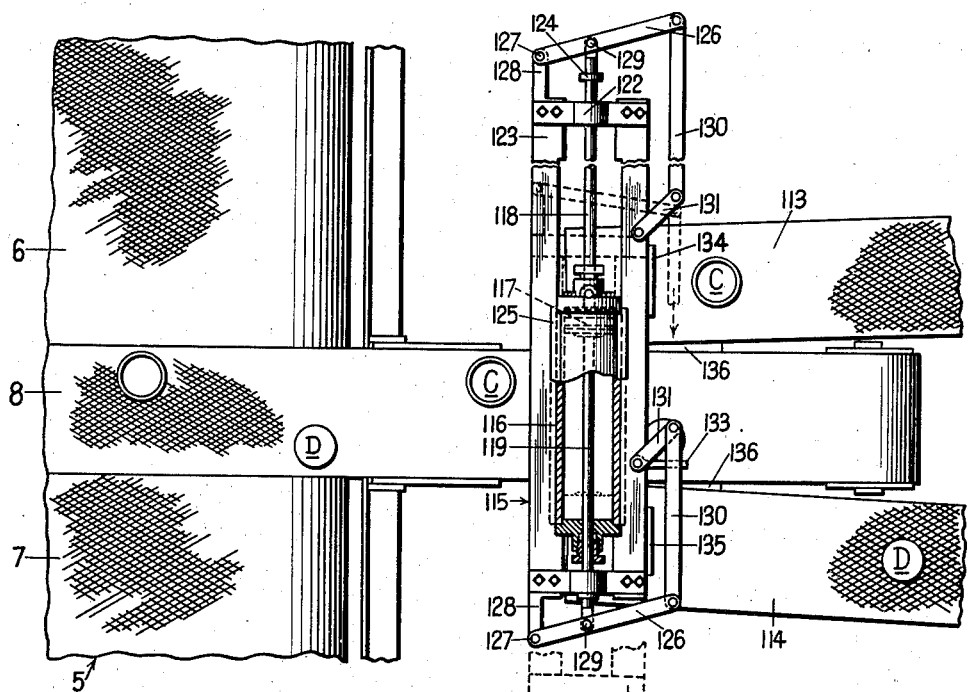
Figure 31 is a top plan view, partly broken away, illustrating a portion of the apparatus shown in Figure 14.
Figure 32:
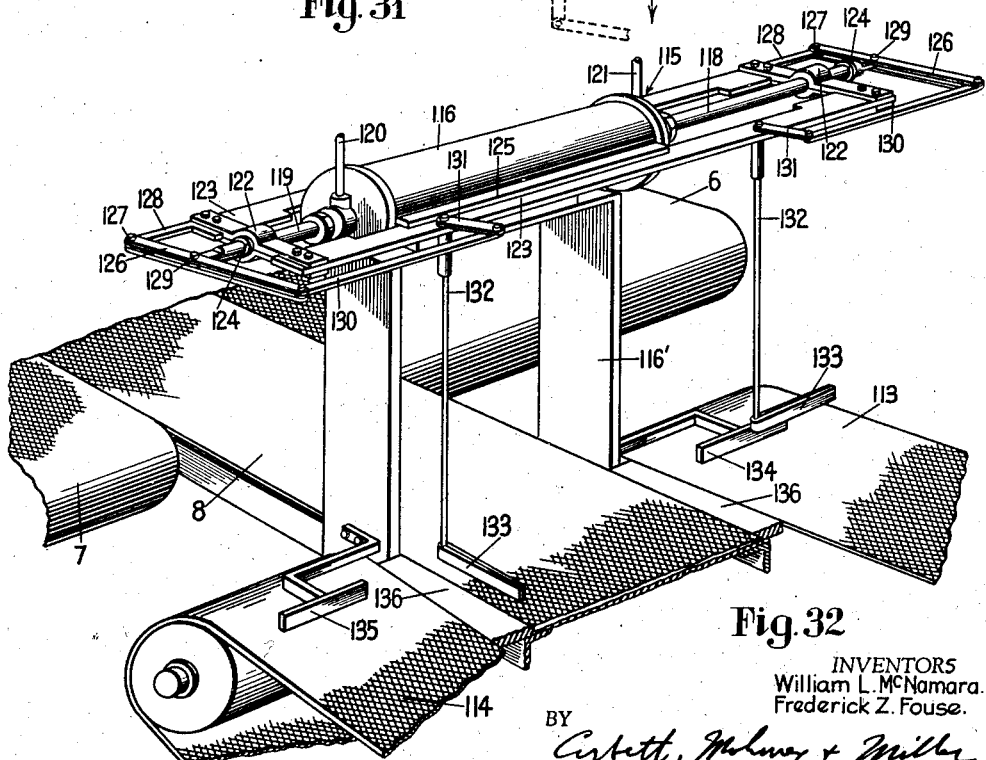
Figure 32 is a perspective view of the apparatus shown in Figure 31.

The unit 115 is illustrated best in Figures 31 and 32. It comprises a double action cylinder and piston unit 116. This unit 116 is supported by supports 116' which straddle the conveyer 8. The unit 116 is horizontally disposed and includes a piston 117 reciprocably mounted in the cylinder and having piston rods 118 and 119 extending from the opposite ends thereof. The piston 117 is first moved in one direction and then in the opposite direction by air supplied to the cylinder and exhausted therefrom through the medium of the lines 120 and 121 connected to opposite ends of the cylinder. The air flow to and from the cylinder may be controlled by the usual type of timing mechanism which may be provided on forming machine 111 or 112 or by the timing mechanism usually provided for the glass feeder.

The outer portion of the rods 118 and 119 are supported for axial movement in sleeve portions 122 formed on the outer ends of frame 123. Each of the rods 118 and 119 is provided with a stop portion 124 adjacent its outer end which will engage the portion 122 and limit inward axial movement of the rod relative to the frame 123. The frame 123 is mounted for reciprocation in guides 125 formed on the unit 116. Each end of the frame 123 carries a lever 126 which is fulcrumed as at 127 to a bracket 128 secured to the frame. The lever 126 is pivoted to the end of the rod as at 129. The opposite end of the lever is pivoted to a link 130. This link 130 is pivoted to the outer end of an arm 131. This arm 131 is keyed on the upper end of a rod 132. This rod 132 is vertically disposed and has an article-engaging arm 133 keyed on its lower end. This arm 133 will be supported at a point slightly above the conveyer 8.

In the operation of this unit 115, assuming that it is in the condition illustrated in Figures 31 and 32, an article C will be carried by the conveyor 113 into association with a stop 134 secured to member 116' adjacent the path of movement of the member 133 disposed above the conveyer 113. At this time the member 113 will be in its outermost position and will be substantially at right angles to the path of movement of conveyer 113. The member 133 will have been swung to this position because the rod 118 has been moved to its outermost position and has swung the lever 126, to which it is connected, outwardly. Air is then supplied to the cylinder to move the piston 117 to the opposite end of the cylinder. This will pull the rod 118 into the cylinder and push the rod 119 out of the cylinder. The rod 118 will move axially relative to the frame 123 until the stop member 124 contacts the frame. This relative movement of the rod and frame swings the arm 133 around to a position at right angles to its original position. Further movement of rod 118 causes the frame 123 to move, carrying the arm 133 along with it. The arm 133 engages the article C and slides it from the conveyer 113 onto the conveyer 8 at one side thereof. Outward movement of rod 119 causes it to move relative to frame 123 and swings the lever 126, connected thereto, outwardly. This swings the member 133, adjacent conveyer 114, into a position at right angles to the path of movement of conveyer 114 and the movement of frame 123 will move this member 133 to a point adjacent the outer edge of conveyer 114. A stop member 135, like stop member 134, is associated with the conveyer 114. Thus, this member 133 will be in position to be brought into engagement with an article D moved into contact with stop 135.

It will be apparent that with this arrangement one of the members 133 will engage an article on one conveyer and slide it onto the conveyer 8 while the other member 133 is simultaneously moved into such a position that it will be ready to engage an article on the other conveyer. In the return movement of each of the members 133, such member will be disposed at right angles to the path of movement of the article-supplying conveyer and will not interfere with an article moving into association with the stop provided therefor.

It will be apparent that with this arrangement the articles C and D coming from the two separate forming machines 111 and 112 will be kept separate from each other. These articles will be carried by the conveyer 8 to the article-guiding and arranging units 37a and 38a. In this instance, it will not be necessary to provide a gate unit like units 39 and 39a for separating the two different types of articles. Between the conveyers 113 and 114 small tapered plates 136 may be provided for bridging the gaps therebetween.

Figure 15:
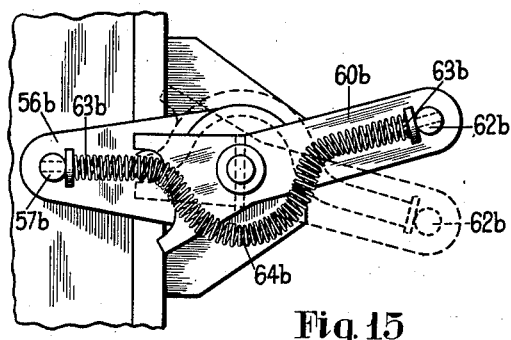
Figure 15 is a top plan view illustrating a modified gate control arrangement.
Figure 16:
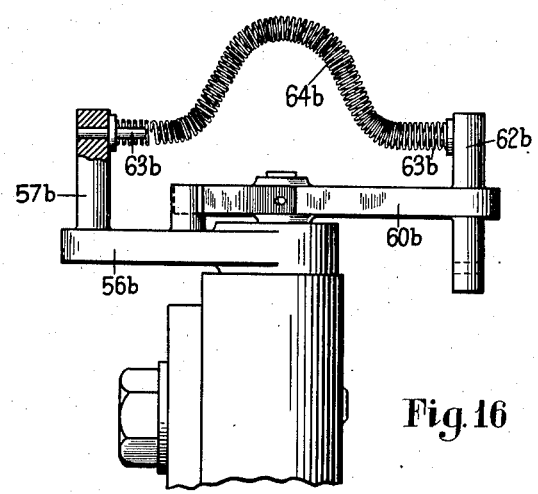
Figure 16 is a side elevational view, partly broken away, of the structure shown in Figure 15.
Figure 17:
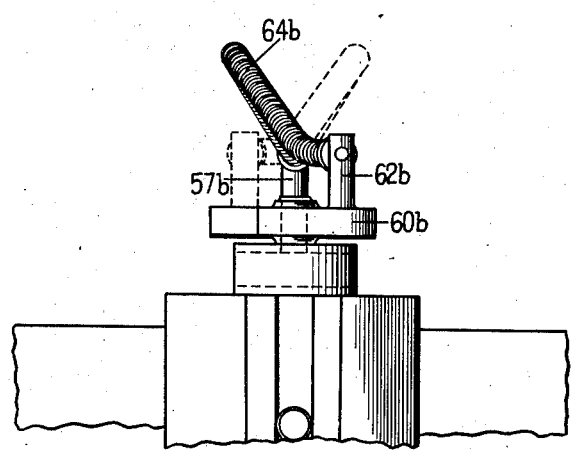
Figure 17 is an end elevational view of the structure shown in Figure 16.

In Figures 15, 16 and 17, we have illustrated a different type of gate control mechanism which may be associated with the gate units 39 or the gate units 71. In this instance all of the mechanism is substantially the same as that previously described with the exception of the spring arrangement. In this instance a compression spring 64b is employed and its ends are passed over pins 63b carried by the upstanding pin portion 57b and 62b formed on members 56b and 60b respectively. The spring 64b is of sufficient length that when it is mounted on the pin 63b it will be of inverted-U form. This U-shaped portion of the spring will swing from one side to the other as the gate is moved from one position to the other. It will function to hold the gate in either position to which it is moved and to aid in moving it to such position after movement is initiated by the article. However, the force exerted by the spring will be overcome by an article coming into contact with the gate and the article will readily initiate movement of the gate.

Figures 18 to 20, inclusive, disclose another type of device which tends to hold the gate in either of its positions. In this instance the shaft 46c has an arm 60c keyed on its upper end and this arm has a cylindrical shaped outer portion. Pivoted to the block portion 47c is an arm 56c. This arm is pivoted for vertical movement and extends over the arm 60c. A setscrew 57c is threaded through the arm and engages the upper end of shaft 46c. By adjusting the setscrew 57c, the vertical position of arm 56c may be adjusted. The arm 56c has a yoke-shaped portion 58c on its outer end. A member 64c is fulcrumed within the yoke member 58c by means of pin and cup bearings 63c. The member 64c is fulcrumed midway between its length and carries a tubular housing in which a plurality of metal balls 640c are disposed. Pins 641c prevent the balls from rolling out the ends of the tubular housing 642c. The member 64c has a pair of upstanding lugs disposed on the upper edge thereof and on opposite sides of the yoke portion 58c and these lugs carry adjustable stop pins 61c. These pins 61c alternately contact with opposite edges of member 58c and limit swinging movement of member 64c. The lower side of member 64c is provided with a depending cam portion which cooperates with the arm 60c. This cam portion has circular notch portions 600c at the ends thereof and an intermediate inverted-V-shaped notch portion 601c which has its vertex in alignment with the fulcrum point of member 642c.

The operation of this mechanism will be clear from Figure 20. With the gate in one position, the arm 60c will be at the right-hand side in the right-hand notch 600c. The ball weight 640c will be in the left-hand end of the housing 642c. As soon as an article contacts the gate and rotates the shaft 46c, the arm 60c will be forced out of the right-hand notch 600c and will be swung to the left. As arm 60c moves into portion 601c of the cam, the left-hand end of member 642c will be lifted upwardly. This will continue until the arm 60c moves into the left-hand notch 600c. As soon as the left-hand end of member 642c is raised sufficiently, the balls will roll to the other end of this member and will aid in forcing the right-hand end of member 642c downwardly. Thus, the balls 640c will move from one end to the other of member 642c and will aid in the movement of this member and also will hold this member in its final position. However, the force of the article against the gate will be sufficient to overcome these weights.

In Figures 21 and 22, we have illustrated a different arrangement adapted to tend to maintain the gate in either of its positions. In this instance the shaft 46d is provided with an arm 60d as before. An arm 56d is pivoted to member 47d for vertical movement and a screw 57d, contacting the upper end of shaft 46d, is provided for adjusting the position of member 56d. The member 56d extends over member 60d and is provided with a depending cam portion adjacent its outer end which rests on the outer end of member 60d. This cam portion is provided with notched portion 600d at each end thereof and an intermediate depending portion 601d. Normally the member 60d will be in one of the notches 600d. The weight of member 56d will tend to prevent movement of member 60d from the notch. However, when an article engages the gate, it will be sufficient to overcome this force and move the member 60d out of one of the notches into the other notch 600d. The weight of member 56d will then tend to hold the member 60d and, consequently, the gate in the new position.

Figure 23:
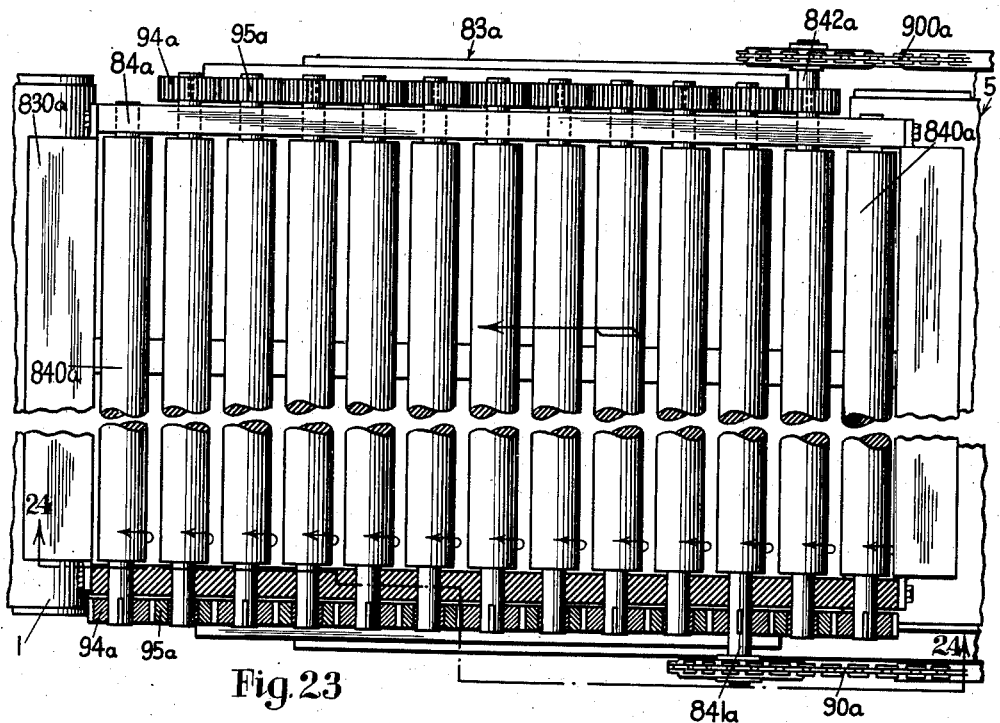
Figure 23 is a top plan view, partly broken away, of a transferring unit of the roller type for transferring articles from the lehr loader conveyer to the lehr conveyer.
Figure 24:
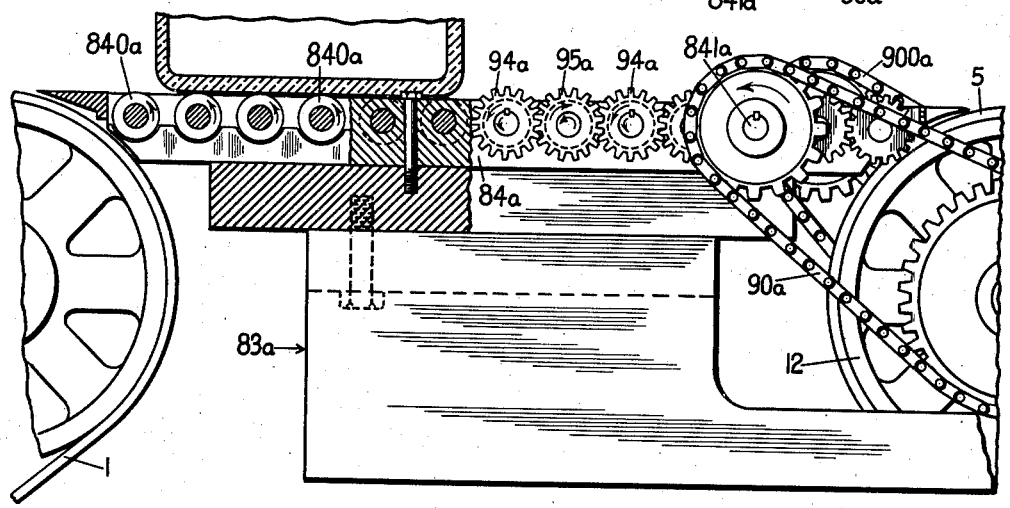
Figure 24 is a vertical sectional view taken substantially along line 24—24 of Figure 23.
Figure 25:
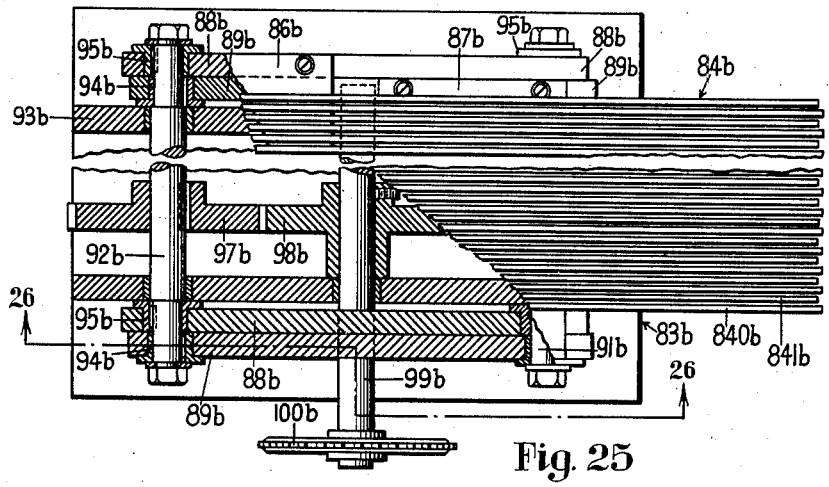
Figure 25 is a top plan view, partly broken away, of a transferring unit of the walking beam type.
Figure 26:
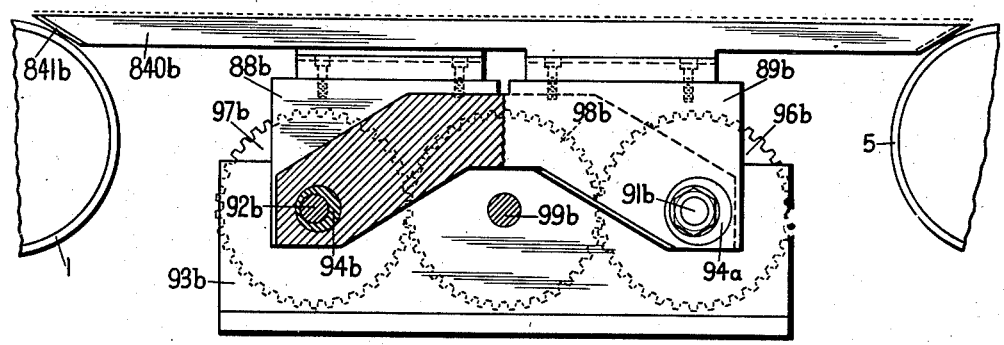
Figure 26 is a vertical sectional view taken substantially along line 26—26 of Figure 25.
Figures 27, 28:
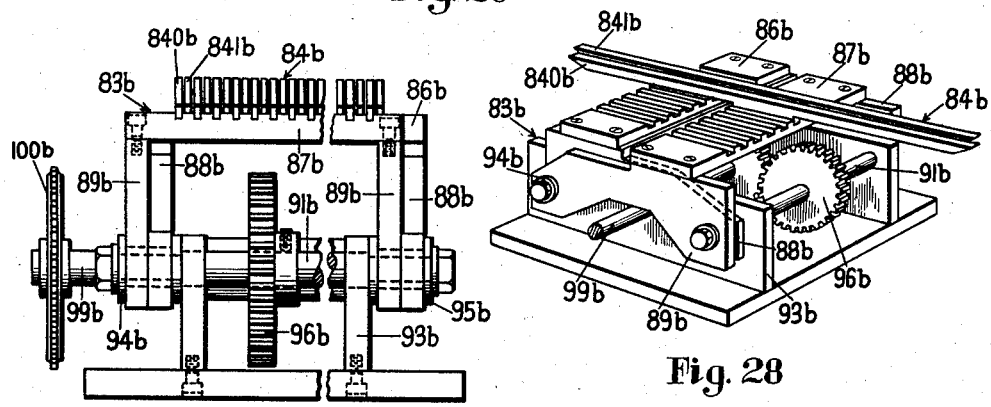
Figure 27 is an end elevational view of the structure shown in Figures 25 and 26.
Figure 28 is a perspective view of the unit shown in Figures 25, 26 and 27.

In Figures 23 and 24, we have illustrated a different type of article-transferring unit 83a which may be used for transferring articles from the conveyer unit 5 to the conveyer unit 1. This unit comprises a frame 84a which carries at each end small plates 830a that overlap the conveyers 1 and 5. The frame 84a has a plurality of transversely extending closely spaced rollers 840a rotatably mounted therein. Each of the roller shafts, with the exception of the shaft of each end roller, is provided with a pinion 94a keyed on one end thereof and a pinion 95a loosely mounted on the other end thereof. The pinions 94a and 95a are in mesh with each other at each side of the frame 84a. The end rollers are merely provided with the pinions 94a at one end thereof. It will be noted that the pinions 94a and 95a are disposed in alternating relationship at each side of the frame. One of the roller shafts is provided with an extension 841a at the end where the pinion 95a is keyed thereon. By means of this extension and a sprocket and chain drive 90a. all of the pinions on that side of the unit are driven. Similarly, one of the roller shafts is provided with an extension 842a at the opposite side of the unit which carries a pinion 95a at that end. By means of this extension and a sprocket and chain drive 900a. all of the pinions on that side of the unit are driven. Thus, it will be apparent that with this arrangement all of the rollers 840a are driven in the same direction. Consequently, this arrangement will serve to transfer the articles from the conveyer unit 5 to the conveyer unit 1. The rollers 840a are preferably driven at such a rate of speed that this unit will also retard the movement of the articles as they are transferred from the conveyer unit 5 to the conveyer unit 1. Consequently, the articles of each longitudinal row will be more closely spaced together. If desired, guide members similar to guide members 96 of unit 83 (Figure 8) may be associated with this unit 83a.

In Figures 25 to 28, we have illustrated another type of article-transferring unit for transferring articles from conveyer unit 5 to conveyer unit 1. This unit 83b comprises a grill 84b extending from one conveyer unit to the other. This grill is composed of two sections 840b and 841b which comprise longitudinally extending laterally spaced bars. The bars of one section of the grill alternate with the bars of the other section of the grill. One section of the grill is carried by a horizontal support 86b extending the full width of the unit while the other section of the grill is carried by a similar horizontal support 87b. The supports 86b and 87b are disposed side by side. The horizontal support 86b is carried by a pair of vertically disposed supports 88b while the horizontal support 87b is carried by a pair of vertically disposed supports 89b. These supports 88b and 89b are disposed at each side of the unit in the manner indicated in Figure 27.

Each of the supports 88b and 89b has one end mounted on a shaft 91b and the other end mounted on a shaft 92b. The shafts 91b and 92b extend transversely and are disposed parallel to each other. They are rotatably mounted in a suitable manner on a supporting frame 93b. At each point where the members 89b are mounted on the shafts 91b and 92b, an eccentric 94b is provided. This eccentric is keyed to the shaft and rotates with the shaft. The eccentric rotates freely in the member 89b. Thus, the eccentric 94b, when rotated, will produce movement of the members 89b in a vertical plane. The members 88b are also carried by the shafts 91b and 92b through the medium of eccentrics 95b which rotate with the shafts. Rotation of the eccentrics 95b will produce movement of the members 88b in a vertical plane.

The shafts 91b and 92b carry gears 96b and 97b keyed thereto. These gears mesh with a gear 98b keyed on the intermediate transverse shaft 99b which is suitably mounted for rotation on the frame 93b. The shaft 99b may be driven by means of a sprocket 100b.

The eccentrics 94b and 95b are so arranged relative to each other that the members 88b will be lifted at the time the members 89b are lowered. This will produce a similar relative movement of the members 86b and 87b and, consequently, of the grill sections 840b and 841b. The section 840b will be first raised, then moved to the right (Figure 26), then downwardly and then finally to the left in a closed vertical path. Similarly, at the same time the grill 841b will be first lowered, then moved to the left, then upwardly and then finally to the right in a closed vertical path. The articles supplied to this unit will first be supported by one grill section and then the other as each grill section moves progressively toward the unit 1. Consequently, the articles will be carried to the unit 1. Sufficient clearance is provided at the ends of the grill sections to prevent interference with the conveyer unit during longitudinal movement of the grill sections. The eccentrics will be driven at a high rate of speed to accomplish this progressive movement of the articles.

Thus, with this unit 83b, the articles will be transferred from the conveyer unit 5 to the conveyer unit 1. During the transfer of the articles, the speed of movement of the articles supplied by the unit 5 will be retarded so that the articles of each longitudinal row supplied by the unit 5 will be brought closer to each other. This unit may be provided with guide members similar to the guide members 96 (Figure 8) is desired.

Figure 29:
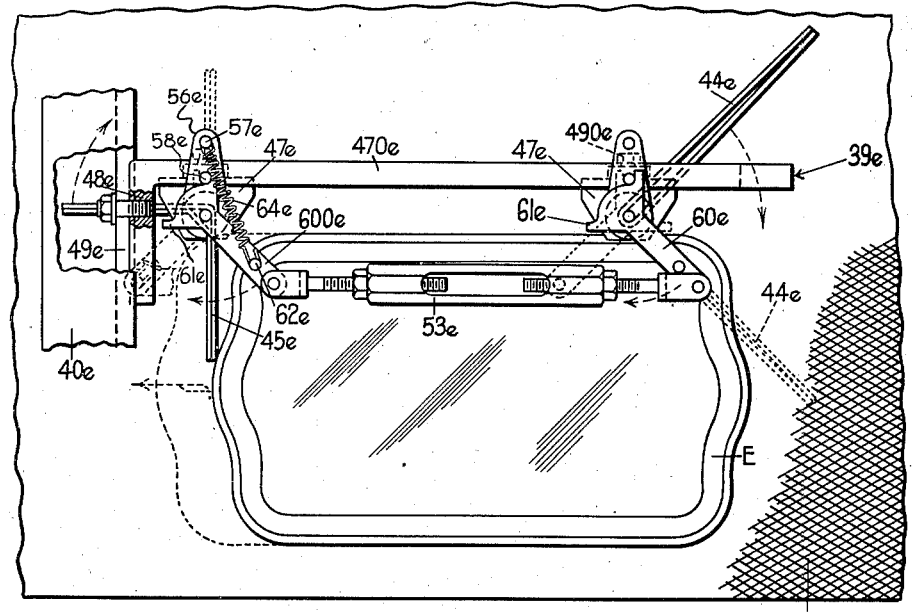
Figure 29 is a plan view, partly broken away, of a gate used to control the feed of rectangular articles to different portions of the article-guiding and arranging apparatus.
Figure 30:
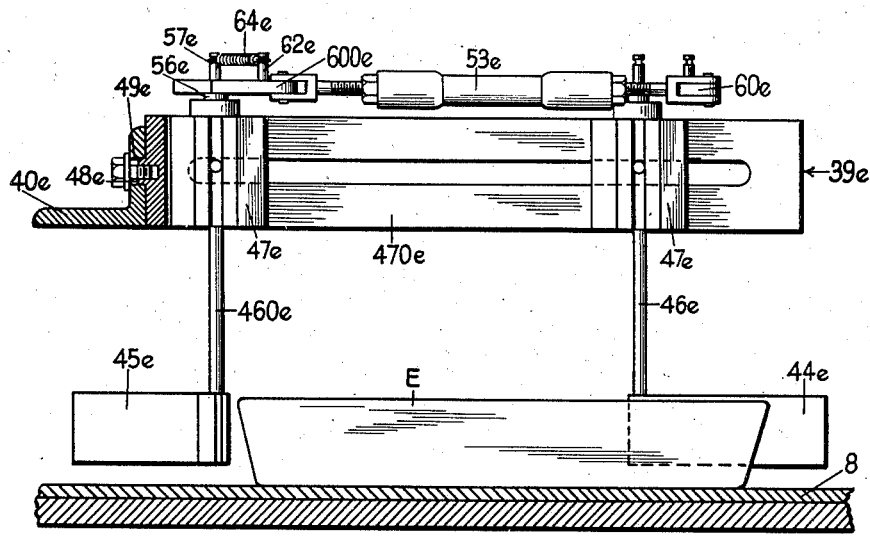
Figure 30 is a side elevational view of the structure shown in Figure 29.

In Figures 29 and 30 we have illustrated the gate structure 39e which may be used in place of the gate structure 39 or 39a. This structure is particularly useful where large rectangular articles E are received by the conveyer 8 of our apparatus. The gate structure 39e is supported similar to the structure 39 on the transverse angle member 40e. This member 40e is provided with a slot 49e which receives a tongue 48e formed on a gate-supporting member 470e. This member 470e extends rearwardly. It will be adjusted along member 40e so that it will be midway between the edges of the conveyer belt 8.

The member 470e is provided with a longitudinal slot and carries forward and rearward shaft-supporting blocks 47e which are adjustable along the slot and held in adjusted position by clamping bolt units 490e associated with the slot. The forward block 47e has a vertical shaft 46e rotatably mounted therein. This shaft carries an article-guiding portion 44e keyed to its lower end and disposed close to the belt 8. The rear member 47e carries a shaft 460e which is rotatably mounted and which carries an L-shaped gate-operating portion 45e keyed to its lower end. In order to operatively connect the members 44e and 45e together, an arm 60e is keyed to the upper end of shaft 46e and an arm 600e is keyed to the upper end of the shaft 460e. An adjustable turnbuckle unit 53e has its opposite ends pivotally connected to arms 60e and 600e which will be disposed in parallel relationship at all times. In order to tend to keep the arm members 60e and 600e, and consequently, members 44e and 45e, in the positions to which they are moved, we provide an off-center spring arrangement 64e associated with the arm member 600e. This spring 64e will be of the tension type and has one end connected to a pin 62e carried by member 600e and the opposite end connected to a pin 57e carried by a laterally extending member 56e which is immovably secured to the member 47e. When the pin 62e moves to one side or the other relative to pin 57e, during swinging movement of member 600e, the spring will function to hold the member 600e in its new position. Swinging movement of member 600e is limited by stop portions 61e formed on the inner end thereof and cooperating with a pin 58e carried by member 56e. An off-center spring arrangement like that just described is also associated with the arm 60e.

In the operation of the gate structure, the member 44e will occupy a position at one side or the other of the center line of the conveyer belt 8. One arm of the member 45e will extend in the direction of movement of the conveyer belt and the other arm will extend at right angles thereto in a direction opposite to that in which the member 44e extends. Thus, assuming that members 44e and 45e are in the positions indicated in Figure 29, the article E disposed at the center of the conveyer belt will be carried by the belt into contact with the member 44e. This member 44e will deflect the article toward the opposite edge of the conveyer belt. As shown in Figure 29, the article will then be carried along by the conveyer belt into contact with the outwardly extending portion of member 45e. This will swing member 45e about its pivot so that the arm engaged by the article will extend in the direction of movement of the article and the other arm will extend toward the opposite edge of the conveyer belt, as indicated by the dotted line. Swinging of the member 45e will cause the member 44e to swing to its other position, as indicated by the dotted line in Figure 29, through the medium of arms 60e, 62e and the link 53e. Thus, the member 44e will be in position to engage the next article E and deflect it to the opposite side of the conveyer belt. The off-center spring arrangements will tend to hold members 44e and 45e into the positions to which they are moved. In fact, they will aid in the movement after it is once initiated by the article. However, engagement of the article with the member 45e will initiate this movement with ease.

In Figures 33 and 34, we have illustrated a modification of our article-guiding and arranging unit. This unit 36b is associated with a single conveyer belt 8b. This conveyer belt will move toward the left of Figure 33. The unit 36b extends transversely of the conveyer belt and is adapted to receive articles in single file disposed along one edge of the conveyer belt, which will be the lower edge of Figure 33.

This unit 36b is supported by a member 65b which is supported by posts 41b a suitable distance above the conveyer belt. The member 65b carries gate units 71b which are practically the same as the unit 71 previously described with the exception that they do not have any mechanism which tends to hold the gates in closed or open position. The gates in this instance are pivotally mounted by pivot structures 460b carried by member 65b. Each gate comprises an article-engaging portion 73b and a gate-opening portion 76b and a gate-closing portion 75b. Guide-members 80b will be associated with each gate. Guide members 77b will be provided at each side of the conveyer belt at the ends of the units 36b.

This unit 36b will function in practically the same manner as the units 37 and 38. The article brought into association with the unit 36b by conveyer 8b will be within guide 77b and will engage the continuous guiding surface formed by portion 73b of all the closed gates. The article will be moved along unit 36b until it reaches the outer end thereof when it will open the outermost gate. Opening of succeeding gates and closing of preceding gates will occur in the manner previously described with reference to units 37 and 38.

It will be apparent from the preceding description that we have provided a lehr loader having many advantages. The glass articles received by our lehr loader will be arranged on the lehr conveyer in a most efficient manner. Our lehr loader is of such a nature that the articles themselves, while passing through the apparatus, automatically arrange themselves in the proper order. Various types of ware can be handled by our apparatus. Different types of ware may be handled simultaneously by our apparatus and be separated into different groups. Our apparatus is of such a nature that distortion of the ware will not occur, even though it has not completely set, and the ware will not be subjected to undue stress. With our apparatus the danger of dropping articles is not present. Our apparatus has a minimum amount of mechanism and, therefore, the initial cost and the operation and upkeep costs will be a minimum. The apparatus can be adjusted readily for use with lehrs of different widths or heights.

Many other advantages will be apparent from the preceding description, the drawings and the following claims.

Having thus described our invention, what we claim is:

1. Article-arranging apparatus comprising movable conveyer means, means for automatically arranging articles in laterally spaced longitudinally extending rows on said conveyer as they are moved along by said conveyer, said means comprising a gate unit disposed transversely of the conveyer at an angle to the direction of travel thereof, said gate unit comprising a plurality of pivoted gate members each thereof having an article-guiding portion located at one side of the pivot point thereof and gate-opening and gate-closing portions at the opposite side of said pivot point, said article-guiding portions providing a continuous uninterrupted guiding surface extending transversely of the conveyer when the gates are in closed position.

2. Article-arranging apparatus comprising a conveyer, means for moving said conveyer, means for automatically arranging articles in laterally spaced longitudinally extending rows on said conveyer as they are moved along by the conveyer, said means comprising a gate unit disposed transversely of the conveyer at an angle to the direction of movement thereof, said gate unit comprising a plurality of movable gate members, each of said gate members having an article-guiding portion, a gate-opening portion and a gate-closing portion, said gate members being normally closed so that said article-guiding portions provide a continuous straight line uninterrupted article-guiding surface extending transversely of the conveyer and being so arranged that the first article supplied to said unit engages said continuous uninterrupted surface and moves to the outermost gate to open it, each succeeding article passing through the space provided by the opening of the preceding gate and serving to close the preceding gate and open the succeeding gate.

3. Article-arranging apparatus comprising a conveyer, means for moving said conveyer, means for automatically arranging articles in laterally spaced longitudinally extending rows on said conveyer as they are moved along by the conveyer, said means comprising a guide member extending transversely of said conveyer at an angle to the direction of movement thereof, said guide member comprising a plurality of movable gates, said gates when in closed position providing a continuous uninterrupted guide surface for an article, and means for opening the outermost gate upon movement of an article into contact therewith and then opening each successive gate and closing the preceding gate upon movement of articles into contacting relation with each successive gate.

4. Article-arranging apparatus comprising a conveyer, means for moving said conveyer, means for automatically arranging articles in laterally spaced longitudinally extending rows on said conveyer as they are moved along by the conveyer, said means comprising a gate unit disposed transversely of the conveyer at an angle to the direction of movement thereof, said gate unit including a plurality of pivotally mounted gate members, each of said gate members comprising an article-guiding portion disposed at one side of the pivot point thereof and gate-opening and gate-closing portions disposed at the opposite side of said pivot point, said gate members being normally closed whereby the article-guiding portions thereof provide a continuous uninterrupted article-guiding surface extending transversely of the conveyer and being arranged to direct the first article supplied to said unit into engagement with said continuous uninterrupted surface until said article engages the gate-opening portion of the outermost gate to open such gate, each succeeding article passing through the space provided by the opening of the preceding gate and engaging the gate-closing portion thereof to close the preceding gate, and thereafter engaging the gate-opening portion of the succeeding gate to open such succeeding gate.

5. Article-arranging apparatus according to claim 4 wherein the means for moving said conveyer causes it to travel at a relatively high speed.

6. Article-arranging apparatus according to claim 4 wherein means is associated with each of said gate members for yieldably holding said member in its closed or its open position.

7. Article-arranging apparatus according to claim 4 wherein each of said gates is carried by a rotatable shaft, and wherein an off-center spring mechanism is associated with said shaft for holding the gate yieldably in either its closed or open position.

8. Article-arranging apparatus according to claim 4 wherein each of said gates is carried by a rotatable shaft, and wherein a weight-operated member is associated with said shaft for yieldably holding said gate in either its closed or open position.

9. Article-arranging apparatus according to claim 4 wherein said gate members are adjustable laterally relative to each other.

10. Article-arranging apparatus according to claim 4 wherein each of said gate members is vertically adjustable relative to said conveyer.

11. Apparatus according to claim 4 wherein two of said gate units are provided and are arranged in V formation with the vertex of the V directed forwardly relative to the conveyer.

12. Apparatus according to claim 4 wherein two of said gate units are provided and arranged in V formation with the vertex of the V directed forwardly relative to the conveyer, and wherein article-actuated means is associated with the conveyer ahead of said vertex for first supplying one article to one of said gate units and the next article to the other of said gate units.

13. Apparatus according to claim 4 wherein two of said gate units are provided and arranged in V formation with the vertex of the V directed forwardly relative to the conveyer, wherein means is provided for supplying articles in single file relationship to said conveyer at a point in front of said vertex, and wherein means is located in front of the vertex for first supplying one article to one of said units and the next article to the other of said units, said means being actuated by movement of the articles into association therewith.

14. Apparatus according to claim 4 wherein two of said gate units are provided and are arranged in V formation with the vertex of the V directed forwardly relative to the conveyer, means for supplying articles in single file relationship to said conveyer at a point in front of said vertex, a gate member in front of said vertex for first supplying an article to one of said units and the next article to the other of said units, and means for positively actuating said gate member at properly timed intervals.

15. Apparatus according to claim 4 wherein two of said gate units are provided and are arranged in V formation with the vertex of the V directed forwardly relative to the conveyer, and means for supplying articles in two longitudinally extending rows on said conveyer at a point in front of said vertex so that the two rows will be on opposite sides of said vertex.

16. Apparatus according to claim 4 wherein said conveyer comprises an intermediate belt and a pair of relatively wider side belts which move together, and wherein two of said gate units are arranged in V formation with the vertex of the V directed forwardly and disposed substantially at the center line of the intermediate belt.

17. Apparatus according to claim 4 wherein said conveyer comprises an intermediate belt and a pair of relatively wider side belts which move together, said intermediate belt having an article-receiving portion extending beyond said side belts, two of said gate units being arranged in V formation with the vertex of the V directed forwardly and disposed substantially at the center line of said intermediate belt, an oscillatable gate member disposed in advance of said vertex and substantially at the center line of said intermediate belt extension, means for supplying articles in a single row to said intermediate belt extension, said oscillatable gate member being actuated by movement of succeeding articles into association therewith to first move an article to one side of the center line of said intermediate belt and the next article to the opposite side of the center line of said belt.

18. Apparatus according to claim 4 wherein said conveyer comprises an intermediate belt and a pair of side belts which move together, said intermediate belt having an article-receiving portion extending beyond said side belts, two of said gate units being arranged in V formation with the vertex of the V directed forwardly and disposed substantially at the center line of said intermediate belt, a gate member disposed ahead of said vertex and substantially at the center line of said intermediate belt extension, means for supplying articles in a single row to said intermediate belt extension, and means for positively actuating said gate member at properly timed intervals to direct an article to one side of the center line of said intermediate belt and the next article to the opposite side of the center line of said intermediate belt.

19. Apparatus according to claim 4 wherein said conveyer comprises an intermediate belt and a pair of side belts which move together, said intermediate belt having an article-receiving portion extending beyond said side belts, two of said gate units being arranged in V formation with the vertex of the V directed forwardly and disposed substantially at the center line of said intermediate belt, and means for supplying articles in two longitudinally extending rows on said intermediate belt extension so that the two rows will be on opposite sides of said vertex.

20. Apparatus according to claim 4 wherein said conveyer comprises an intermediate belt and a pair of side belts which move together, said intermediate belt having an article-receiving portion extending beyond said side belts, two of said gate units being arranged in V formation with the vertex of the V directed forwardly and disposed substantially at the center line of said intermediate belt, and means for supplying articles in two longitudinally extending rows on said intermediate belt extension so that the two rows will be on opposite sides of the said vertex, said means comprising article-supplying conveyers disposed on opposite sides of said belt extension, and means operating at timed intervals for first transferring an article from one of said conveyers to said extension at one side of the center line thereof and then from the other of said conveyers to said extension at the opposite side of the center line thereof.

21. Apparatus according to claim 4 wherein two of said gate units are provided and are arranged in V formation with the vertex of the V directed forwardly relative to the conveyer, means for supplying articles in single file relationship to said conveyer at a point in front of said vertex, and a gate member in front of said vertex for first supplying an article of the single file to one of said units and the next article to the other of said units, said gate member comprising a pivoted gate portion disposed substantially in alignment with said vertex, and a pivoted gate-actuating member of L shape pivoted at a point substantially in alignment with said vertex and at a point behind said gate portion, and a link for operatively connecting said gate portion and said gate-actuating member together for simultaneous movement about their pivots.

22. Apparatus according to claim 1 wherein the conveyer means comprises an article-supplying conveyer and an article-receiving conveyer continuously moving and extending in the same direction, the adjacent ends of said conveyers being disposed in spaced relationship, and wherein a transfer unit is disposed between the adjacent ends of said conveyers and bridges the space therebetween.

23. Apparatus according to claim 1 wherein said conveyer means comprises article-supplying and article-receiving conveyers continuously moving and extending in the same direction and whose adjacent ends are disposed in spaced relationship, a transfer unit disposed between the adjacent ends of the conveyers for bridging the space therebetween, said transfer unit including an article-receiving surface disposed between said conveyers and extending transversely thereof and having a supporting structure, said supporting structure including a transversely extending support and upright flexible members carried by said support and connected to the article-receiving surface for supporting said article-receiving surface, and wherein means is provided for imparting vibratory movement to said article-receiving surface.

24. Article-arranging apparatus comprising movable conveyer means, said means including an article-supplying conveyer and an article-receiving conveyer continuously moving and extending in the same direction, means for automatically arranging articles in laterally spaced longitudinally extending rows on said conveyer means as they are moved along by the conveyer means, said means comprising a gate unit disposed transversely of the conveyer means at an angle to the direction of travel thereof, said gate unit comprising a plurality of pivoted gate members each thereof including an article-guiding portion located at one side of the pivot point thereof and gate-opening and gate-closing portions at the opposite side of said pivot point, said article-guiding portions providing a continuous uninterrupted guiding surface extending transversely of the conveyer when all of said gates are in closed position, the adjacent ends of said conveyers being disposed in spaced relationship, a transfer unit located between the adjacent ends of the conveyers and bridging the space therebetween, said transfer unit including an article-receiving member disposed between the conveyers and extending transversely thereof, a supporting structure for said article-receiving member including a transverse supporting member and upright flexible members carried by said supporting member and having their upper ends connected to said article-receiving member, and means for imparting vibratory movement to said article-receiving member through the medium of said upright flexible members.

25. Apparatus according to claim 1, wherein said conveyer means is power-driven and comprises a pair of spaced parallel endless outer conveyer members and a relatively narrower intermediate endless conveyer member whose upper flights extend generally in the same plane, and wherein the outer and intermediate conveyer members travel at the same speed.

26. Apparatus according to claim 1 wherein said movable conveyer means comprises a pair of transversely spaced longitudinally extending relatively wide endless conveyer members defining opposite sides of the apparatus and a relatively narrower and longer endless conveyer member interposed between and in substantial parallelism to said spaced conveyer members, and wherein said conveyer members are all driven at the same rate of speed.

27. Apparatus according to claim 1, wherein the article-guiding portion of a gate member overlaps the gate-opening and gate-closing portion of an adjacent gate member when said members are in closed position.

28. Apparatus according to claim 4 wherein two of said gate units are provided and arranged in V formation and wherein the article-guiding portion of each of the gate members of the units overlaps the gate-opening and gate-closing portion of an adjacent gate member when the adjacent gate members are in closed position.

29. Apparatus according to claim 4, wherein two of said gate units are provided and arranged in V formation transversely of the conveyer, and wherein the gate-opening and gate-closing portions of all of said gate members of both the units with the exception of the outermost gate member of each unit are overlapped by the article-guiding portions of the other adjacent gate members of said units when the gate members are in closed position whereby to provide two continuous uninterrupted article-guiding surfaces.

30. In an apparatus for positioning ware of various kinds, shapes and sizes on a lehr conveyer, the combination of a lehr conveyer, a ware-supplying conveyer located adjacent to but spaced from the lehr conveyer, ware transfer means located between and cooperating with said conveyers, and means for automatically arranging ware on said conveyers, said last-named means comprising a series of ware-movable gate members providing a continuous uninterrupted surface along which the ware is moved by the ware-supplying conveyer, portions of each of the gates of the series engaging and overlapping portions of adjacent gates in the series when adjacent gates are in closed position.

31. Ware-arranging apparatus adapted to be associated with movable conveyer means, said apparatus including a gate unit comprising a plurality of movably mounted gate members located above but adjacent to the conveyer means, said gate members having forward guiding portions adapted to be engaged by ware transported by said conveyer means and rear portions providing gate-opening and gate-closing means, said gate members when in closed position providing a continuous uninterrupted guiding surface for the ware to direct it in substantially a straight-line path while being transported by the conveyer means.

32. Apparatus according to claim 31 wherein the forward portion of each of said gate members overlaps the rear portion of an adjacent gate member.

33. Apparatus according to claim 31 wherein the forward portion of one of an adjacent pair of gate members overlaps the rear portion of the other gate member of the pair in contacting relation whereby to provide an uninterrupted guiding surface for the ware when said pair of gate members is in closed position.

WILLIAM L. McNAMARA.
FREDERICK Z. FOUSE.